(12) United States Patent
Lee et al.

(10) Patent No.: US 10,747,042 B2
(45) Date of Patent: Aug. 18, 2020

(54) ELECTRONIC DEVICE INCLUDING A FINGERPRINT SENSOR DISPOSED IN AN OPENING AREA OF A METAL FRAME

(71) Applicant: LG ELECTRONICS INC., Seoul (KR)

(72) Inventors: Byunghwa Lee, Seoul (KR); Youngin Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/562,875

(22) Filed: Sep. 6, 2019

(65) Prior Publication Data

US 2019/0391432 A1    Dec. 26, 2019

Related U.S. Application Data

(63) Continuation of application No. 15/670,892, filed on Aug. 7, 2017, now Pat. No. 10,488,693.

(30) Foreign Application Priority Data

Mar. 30, 2017   (KR) .......................... 10-2017-0040988

(51) Int. Cl.
*G02F 1/1333*   (2006.01)
*G06K 9/00*    (2006.01)
(Continued)

(52) U.S. Cl.
CPC .......... *G02F 1/13338* (2013.01); *G06F 1/169* (2013.01); *G06F 1/1626* (2013.01);
(Continued)

(58) Field of Classification Search
CPC .... G02F 1/13338; G02F 1/1343; G06F 3/041; G06F 1/1643; G06F 1/1658; G06F 1/169;
(Continued)

(56) References Cited

U.S. PATENT DOCUMENTS

2014/0047706 A1   2/2014   Shaikh et al.
2015/0042910 A1   2/2015   Satou
(Continued)

FOREIGN PATENT DOCUMENTS

| | | |
|---|---|---|
| CN | 104092926 A | 10/2014 |
| EP | 2 824 549 A1 | 1/2015 |
| WO | WO 2016/065482 A1 | 5/2016 |

OTHER PUBLICATIONS

European Patent Office Application Serial No. 17001462.5, Search Report dated Feb. 26, 2018, 9 pages.

*Primary Examiner* — Yaron Cohen
(74) *Attorney, Agent, or Firm* — Birch, Stewart, Kolasch & Birch, LLP

(57) ABSTRACT

An electronic device including a window defining an appearance of a front surface of the electronic device; a display module disposed below the window; a touch sensor disposed between the window and the display module; a fingerprint sensor disposed below the display module; and a controller configured to in response to the touch sensor receiving a single touch input while the display module is in a deactivated state, display a graphic image at a region of the display module overlapped with the fingerprint sensor; in response to the touch sensor receiving a double touch input while the display module is in the deactivated state, display a full screen image on the display module and the graphic image at the region of the display module overlapped with the fingerprint sensor; control the fingerprint sensor to detect fingerprint information through the graphic image at the region of the display module; and perform an authentication procedure to release a lock state of the electronic device when the detected fingerprint information matches pre-stored fingerprint information.

18 Claims, 24 Drawing Sheets

(51) Int. Cl.
*G06F 3/041* (2006.01)
*G06F 3/0488* (2013.01)
*G06F 1/16* (2006.01)
G06F 3/044 (2006.01)
G02F 1/1343 (2006.01)

(52) U.S. Cl.
CPC .......... *G06F 1/1643* (2013.01); *G06F 1/1658* (2013.01); *G06F 1/1684* (2013.01); *G06F 1/1686* (2013.01); *G06F 3/041* (2013.01); *G06F 3/0488* (2013.01); *G06K 9/00013* (2013.01); *G02F 1/1343* (2013.01); *G06F 3/044* (2013.01); *G06F 2203/04105* (2013.01); *G06K 9/0004* (2013.01)

(58) Field of Classification Search
CPC .... G06F 3/0488; G06F 1/1626; G06F 1/1684; G06F 1/1686; G06F 3/044; G06F 2203/04105; G06K 9/00013; G06K 9/0004
See application file for complete search history.

(56) References Cited

U.S. PATENT DOCUMENTS

| | | |
|---|---|---|
| 2015/0205993 A1 | 7/2015 | Han et al. |
| 2016/0148037 A1 | 5/2016 | Baek et al. |
| 2017/0011623 A1 | 1/2017 | Kim et al. |
| 2017/0063851 A1 | 3/2017 | Kim et al. |
| 2017/0308215 A1* | 10/2017 | Cho ................ G06F 3/0487 |
| 2018/0035923 A1 | 2/2018 | Kang et al. |
| 2018/0096187 A1 | 4/2018 | Kwon et al. |

* cited by examiner

ELECTRONIC DEVICE INCLUDING A FINGERPRINT SENSOR DISPOSED IN AN OPENING AREA OF A METAL FRAME

CROSS-REFERENCE TO RELATED APPLICATIONS

This Application is a Continuation of co-pending U.S. patent application Ser. No. 15/670,892 filed on Aug. 7, 2017, which claims the priority benefit under 35 U.S.C. § 119(a) to Korean Patent Application No. 10-2017-0040988 filed in the Republic of Korea on Mar. 30, 2017, all of which are hereby expressly incorporated by reference into the present application.

BACKGROUND OF THE INVENTION

1. Field of the Invention

This specification relates to an electronic device including a touch sensor receiving a touch input.

2. Background of the Invention

Terminals may be divided into mobile/portable devices and stationary devices according to mobility. Also, the mobile devices may be classified into handheld types and vehicle mount types according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a terminal but also software improvement to support and improve functions of the terminal.

In recent years, with development of various functions of an electronic device such as a mobile terminal, functions of scanning a finger and sensing a pressure touch are also added. However, when a pressure touch module and a finger scan module are arranged beneath a display unit in an overlapping manner, one of the functions is difficult to be executed.

SUMMARY OF THE INVENTION

Therefore, to obviate the aforementioned problem and other drawbacks, an aspect of the present invention is to provide an electronic device capable of sensing a touch input and acquiring fingerprint information.

To achieve these and other advantages and in accordance with the purpose of this specification, as embodied and broadly described herein, there is provided an electronic device, including a first assembly having a window, a display module divided into a first area outputting an image thereon, and a second area surrounding the first area, and a touch sensing layer sensing a touch applied to the first area, and a second assembly coupled to the first assembly, and having a first case forming an inner space for accommodating a plurality of electronic components therein, and a main circuit board, wherein the second assembly comprises a finger scan module disposed in one area of the inner space, sensing a finger or fingerprint, and disposed in a manner of overlapping the first area, wherein the first assembly comprises a pressure touch sensing layer disposed beneath the display module and sensing a pressure touch, wherein the pressure touch sensing layer comprises an opening area formed through one area corresponding to the finger scan module, such that the finger scan module is disposed adjacent to the display module, and wherein the opening area is recessed from an edge of the pressure touch sensing layer.

In one embodiment disclosed herein, the pressure touch sensing layer may include first and second base substrates, first and second electrode layers formed on the first and second base substrates, respectively, and an insulating layer interposed between the first and second base substrates, and each of the first and second base substrates and the insulating layer may be provided with a recess. Accordingly, the finger scan module can be arranged adjacent to the display unit through the pressure touch sensing layer.

In one embodiment disclosed herein, the first assembly may include a metal layer disposed beneath the display module to discharge heat, and first and second graphite sheets disposed on both surfaces of the metal layer to diffuse heat. Each of the metal layer and the first and second graphite sheets may include an opening overlapping one area of the opening area and having the finger scan sensor inserted therethrough.

According to the present invention, a pressure touch sensing layer and a finger scan module may be provided and an opening area may be formed through one area of the pressure touch sensing layer such that the finger scan module can be arranged adjacent to the display unit. Therefore, fingerprint information can be acquired by a specific area on the display unit.

Also, graphite sheets for heat dissipation may be provided with an opening through which a finger scan sensor of the finger scan module is inserted, which may allow a finger scan function to be performed while forming a heat dissipation structure.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Electronic devices presented herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
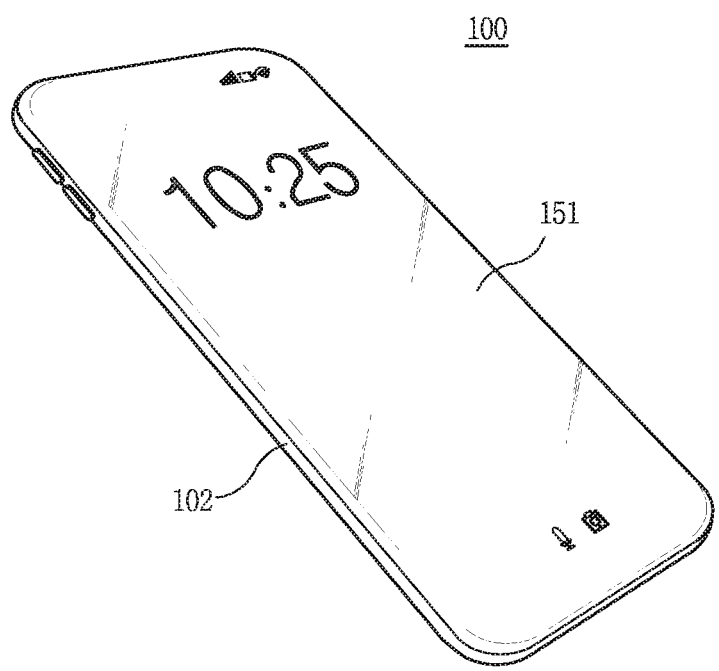
FIG. 1A is a conceptual view of an electronic device in accordance with one embodiment of the present invention, viewed from one direction.

FIG. 1A is a conceptual view of an electronic device in accordance with one embodiment of the present invention, viewed from one direction.

Referring to FIG. 1A, an electronic device 100 according to the present embodiment includes a bar-like terminal body. The electronic device 100 includes a case (for example, a housing, a frame, a cover, and the like) that defines appearance thereof.

A display unit 151 is disposed on a front surface of the electronic device 100. The display unit 151 may include a window, a display module, a touch sensor, and the like. The window defines the appearance of the electronic device 100.

The electronic device 100 may include a case 101 forming side surfaces and a rear surface. Various electronic components are disposed in an inner space formed by the display unit 151 and the case 101. At least one support frame for supporting the electronic components may be disposed inside the case 101.

Although not illustrated specifically, the electronic device 100 includes a frame coupled to the case 102 while supporting the display unit 151. A first assembly of the electronic device may include the frame and the display unit 151, and a second assembly may be defined by the case 101 and the electronic components mounted within the inner space.

The window or the window and the display module according to this embodiment may have curved edges.

The display module displays (outputs) information processed in the electronic device 100. For example, the display module may display execution screen information of an application program driven in the electronic device 100, or UI (User Interface) and GUI (Graphic User Interface) information according to the execution screen information.

The display module may include at least one of a liquid crystal display (LCD), a thin film transistor liquid crystal display (TFT LCD), an organic light-emitting diode (OLED), a flexible display, a three-dimensional display (3D display), and an electronic ink display (e-ink display).

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided within the display.

In this way, the display unit 151 may form a touch screen together with the touch sensor, and in this case, the touch screen may function as a user input unit.

The window defining appearance of a front surface of the electronic device 100 is formed to cover an entire area of the front surface. That is, the case 101 is bonded along edges of the window to form a main body, and the window 101 is formed to cover the inner space formed by the case 101. In addition, since the window is not provided with a specific hole, an electronic component such as a button portion is not formed on the front surface of the electronic device 100.

Alternatively, the window may include an audio output module for outputting sound and a hole for arranging a camera.

The electronic device 100 according to this embodiment is not provided with the user input unit, such as the button portion, on the front surface thereof, and thus a graphic image or the like for performing the same function as a function of the button portion may be output on one area of the display unit 151.

Figure 1B:
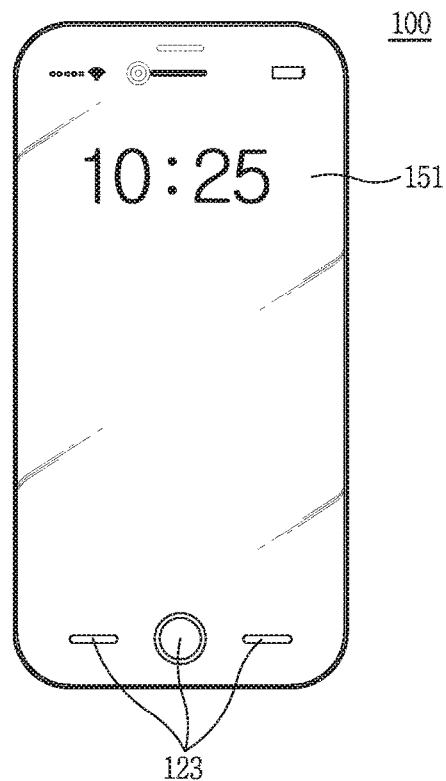
FIGS. 1B and 1C are conceptual views illustrating an electronic device in accordance with another embodiment, viewed from different directions.
Figure 1C:
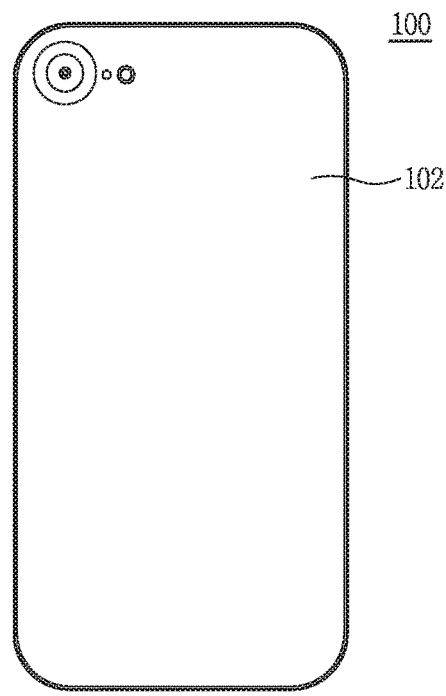

FIGS. 1B and 1C are conceptual views of an electronic device according to another embodiment, viewed from different directions.

Referring to FIGS. 1B and 1C, the electronic device 100 includes a display unit 151 disposed on a front surface thereof and including a window, a display module, and a touch sensor, and a case 102 disposed on a rear surface thereof. The electronic device 100 according to the another embodiment may be configured by first and second assemblies of FIG. 1A, and a redundant description will be omitted.

Meanwhile, the display unit 151 includes a user input unit 123 formed beneath the window. For example, the user input unit 123 may configure an area for receiving a touch input. The user input unit 123 may be implemented by light output from the display module or implemented as a metal portion displayed on the display module or the window.

Alternatively, at least one of the user input units 123 may be a button portion which penetrates through the window to define an appearance. The button portion includes a push module, and the push module may be mounted to be inserted through a through hole of the window.

Hereinafter, components of the electronic device 100 according to various embodiments of the present invention will be described with reference to the exploded views.

Figure 2A:
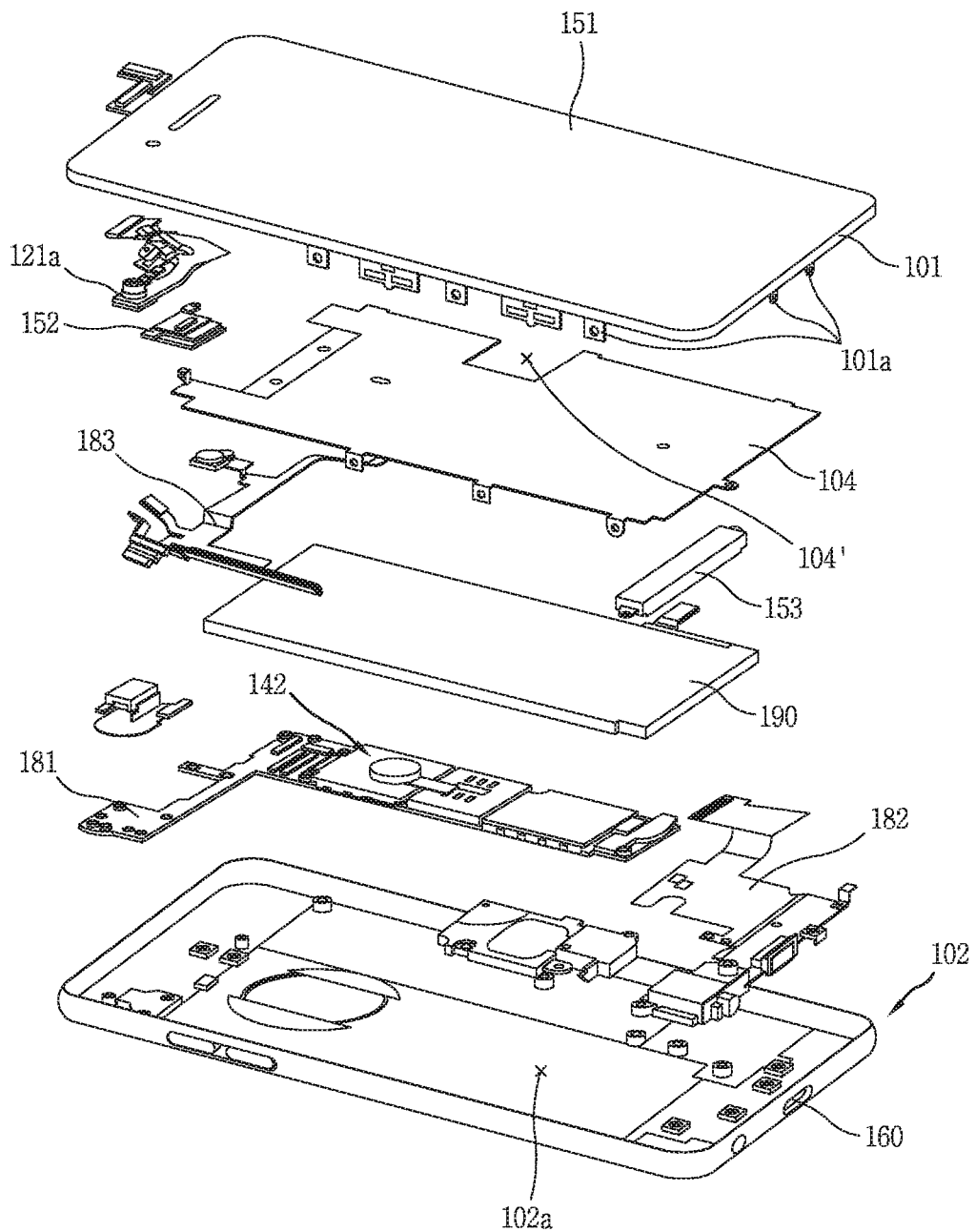
FIGS. 2A and 2B are exploded views of electronic devices in accordance with different embodiments of the present invention.
Figure 2B:
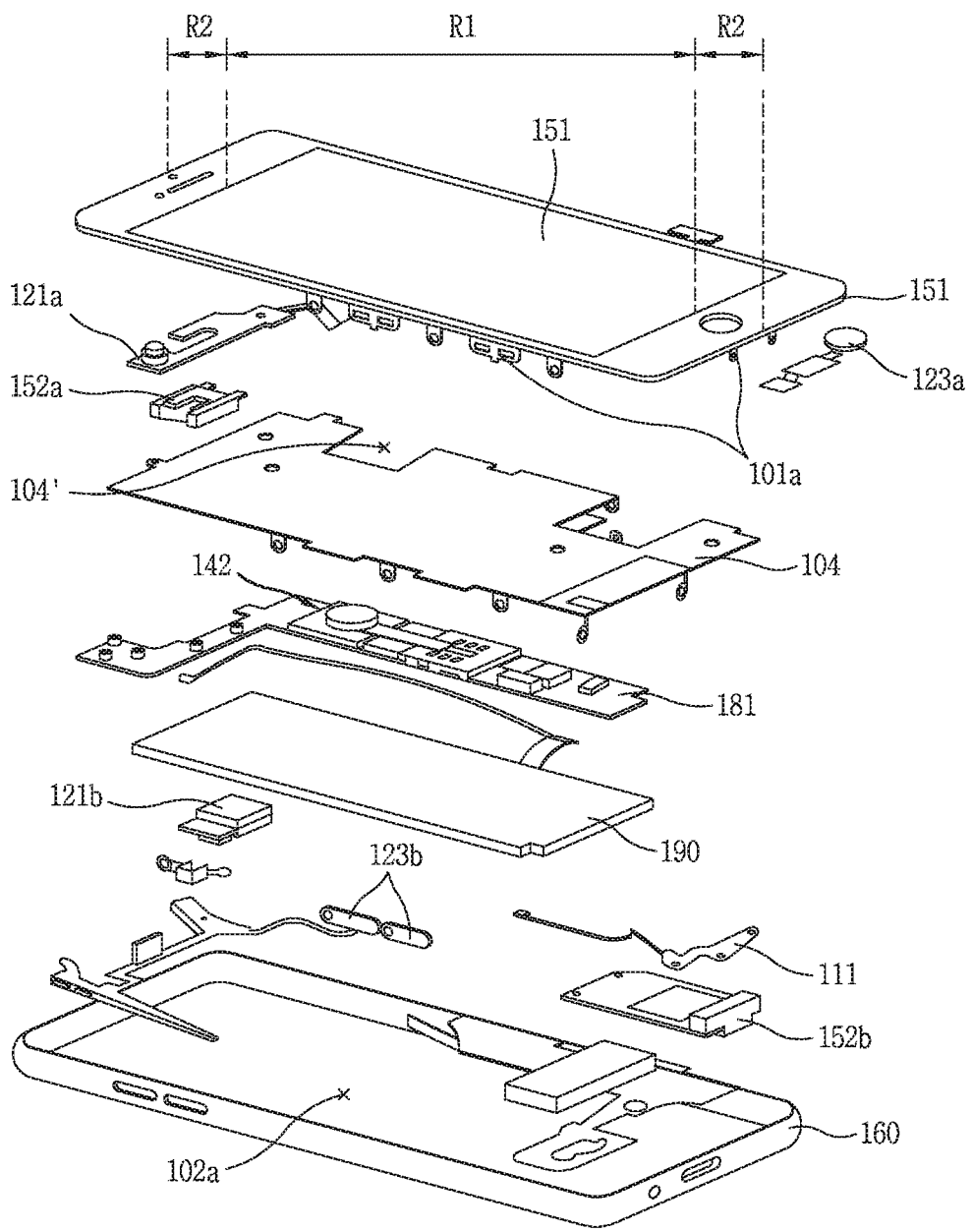

FIGS. 2A and 2B are exploded views of electronic devices according to different embodiments of the present invention.

Referring to FIG. 2A, a first assembly of the electronic device 100 includes a display unit 151 and a support frame 101. The second assembly includes a case 102 having an inner space 102', a metal support unit 104, first to third circuit boards 181, 182 and 183, and a plurality of electronic components.

The support frame 101 is coupled to the metal support unit 104 and the case 102 while supporting the display unit 151.

The display unit 151 according to this embodiment includes a window, a display module, and a touch sensor. Although not illustrated, the display unit 151 may include a pressure touch sensing layer for sensing a pressure touch having pressure stronger than or equal to a predetermined reference pressure.

In addition, the second assembly may include a heat dissipation unit for externally dissipating heat generated in the electronic device 100. For example, the heat dissipation unit may be made of at least one of a graphite sheet, a PU sheet, and a metal plate.

The support frame 101 includes coupling protrusions 101a protruding from one surface thereof supporting the display unit 151 to couple the support frame 101 to the metal support unit 104 and the case 102. The window is disposed to cover a front surface of the display unit and the support frame 101 supporting the display unit. The electronic device 100 according to this embodiment does not include a button portion arranged to be inserted through the window.

The second assembly includes first and second cameras 121a and 121b accommodated in the inner space 102a, an audio output module 152, a haptic module 153, the first to third circuit boards 181, 182 and 183, a power supply unit 190 for supplying power, a finger scan module 142, and a metal support unit 104.

The second camera 121b has a capturing direction which is substantially opposite to that of the first camera 121a. The second camera 121b may include a plurality of lenses arranged along at least one line. The plurality of lenses may be arranged in a matrix form. Such a camera may be named an 'array camera'. When the second camera 121b is configured as an array camera, images may be taken in various ways using the plurality of lenses, and a better quality image can be obtained.

The audio output module 152 may be implemented in a form of a receiver for delivering a call sound to a user's ear or a loud speaker for outputting various alarm sounds or multimedia playback sounds.

The window may be provided with sound holes for emitting sounds generated from the audio output module 152. However, the present invention is not limited thereto, and the sounds may be emitted along an assembly gap between structures. In this case, the holes formed independently for outputting the sounds are invisible or hidden, so that the appearance of the electronic device 100 can be more simplified.

The haptic module 153 outputs vibration based on a specific control command and the user may sense the vibration generated in the haptic module 153 through the display unit 151, the case 101 and the like.

The power supply unit 190 may include a battery that is disposed within the terminal body or detachably coupled to an outside of the terminal body. The battery may receive power through a power cable connected to the interface unit 160. The battery may also be configured to be wirelessly chargeable through a wireless charger. The wireless charging may be implemented by a magnetic induction method or a resonance method (magnetic resonance method).

The metal support unit 104 is disposed to cover a remaining area of the inner space 102a except for the finger scan module 142.

The power supply unit 190 is disposed in one area of the inner space 102a and the first to third circuit boards 181, 182, and 183 are disposed on the remaining area. A plurality of electronic components are disposed on the first to third circuit boards 181, 182, and 183.

The finger scan module 142 is mounted on the first circuit board 181. The finger scan module 142 does not overlap the power supply unit 190. The metal support unit 104 includes an opening area 104' corresponding to one area where the finger scan module 142 is disposed. The opening area 104' may be in a form of being recessed from a specific edge.

The finger scan module 142 is exposed from the metal frame 104 through the opening area 104' and disposed adjacent to one area of the display unit 151. Accordingly, fingerprint information related to a finger touching the window may be detected.

The electronic device 100 includes first to fourth side surfaces. The first and second side surfaces are opposed to each other and the third and fourth side surfaces are opposed to each other. The first camera 121a and the audio output module 152 may be disposed adjacent to the first side surface and the interface unit 160 may be disposed on the second side surface.

Meanwhile, the finger scan module 142 may be disposed adjacent to a part of the third and fourth side surfaces. Accordingly, the user can perform a specific function by sensing a fingerprint through the finger scan module 142 while holding the electronic device 100 in a hand.

The electronic device 100 according to FIG. 2B includes the first assembly having the display unit 151, a first user input 123a, the support frame 101, and the second assembly having the case 102 including the inner space 102a, the metal frame 104, and a plurality of electronic components disposed in the inner space 102a.

The first assembly includes the first user input 123a disposed through the window. The display module includes an output area R1 for outputting an image and a peripheral area R2 of the output area R1. The first user input unit 123a is disposed in the peripheral area R2.

The first assembly may further include a first camera 121a and a first audio output unit 152a disposed on the front surface of the electronic device 100. Also, the electronic components included in the first assembly may not be limited thereto. Although not illustrated, the first assembly may further include a pressure touch sensing layer for sensing a pressure touch over reference pressure.

In addition, the second assembly may include a heat dissipation unit for externally dissipating (radiating) heat generated in the electronic device 100. For example, the heat dissipation unit may be made of at least one of a graphite sheet, a PU sheet, and a metal plate.

Meanwhile, the second assembly includes the power supply unit 190 disposed in one area of the inner space 102a, and the first circuit board 181 disposed in the remaining area. An antenna unit 111, a second audio output module 152b, a second camera 121b, and the like may be mounted on the first circuit board 181. In addition, the second user input unit 123b may be disposed on one side surface by the case 102.

In addition, the finger scan module 142 is disposed in one area of the first circuit board 181. For example, the finger scan module 142 may be disposed adjacent to an edge of the electronic device 100 which is formed by the case 102 and the display unit 151.

The inner space 102a is covered with the metal frame 104. The metal frame 104 includes an opening area 104' through which the finger scan module 142 is disposed adjacent to the display part 151. Accordingly, the finger scan module 142 is not covered with the metal frame 104.

The electronic device 100 includes first to fourth side surfaces. The first and second side surfaces are opposed to each other and the third and fourth side surfaces are opposed to each other. The first camera 121a and the audio output module 152 may be disposed adjacent to the first side surface and the interface unit 160 may be disposed on the second side surface.

Meanwhile, the finger scan module 142 may be disposed adjacent to a part of the third and fourth side surfaces. Accordingly, the user can perform a specific function by sensing a fingerprint through the finger scan module 142 while holding the electronic device 100 in a hand.

Figure 3A:
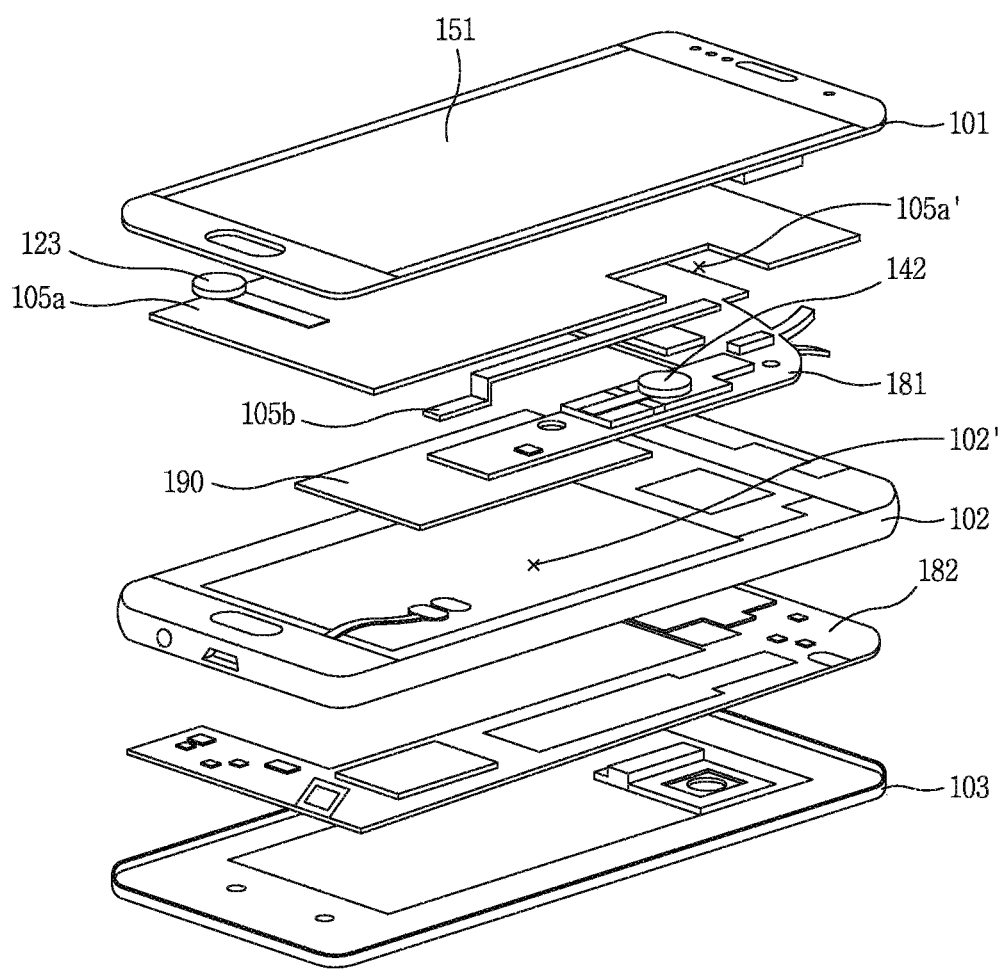
FIGS. 3A and 3B are exploded views of electronic devices in accordance with different embodiments.
Figure 3B:
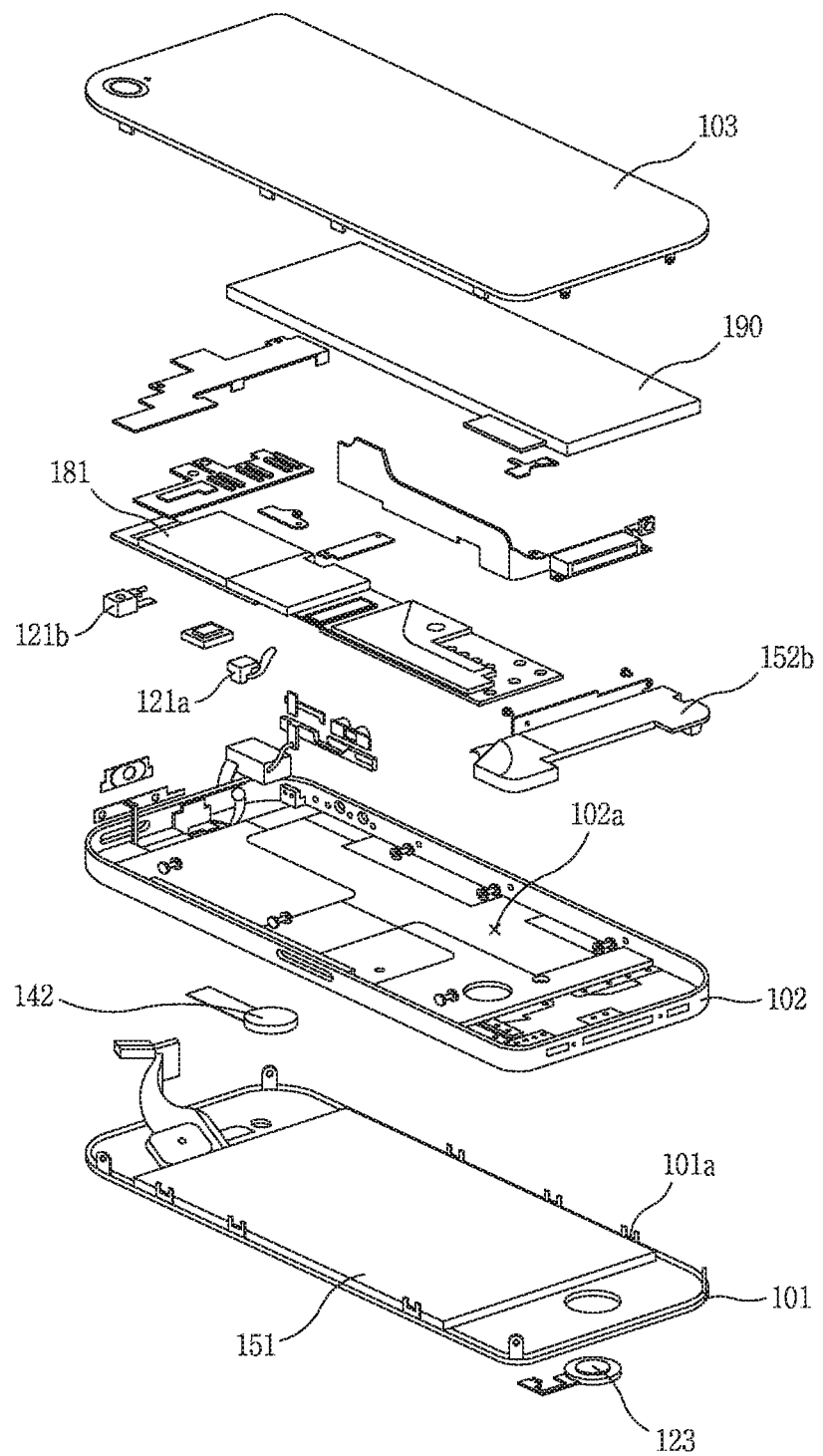

FIGS. 3A and 3B are exploded views of electronic devices according to different embodiments.

Referring to FIG. 3A, the electronic device 100 includes a first assembly having a display unit 151 and a support frame 101, a second assembly having a case 102 provided with an inner space 102a, a first circuit board 181 and a power supply unit 190, and a rear cover 103 attached to the case 102 to form a rear appearance of the electronic device 100.

Positions of electronic components disposed in the case 102 and the remaining components, except for the rear cover 103 and the first and second heat dissipation members 105a and 105b, are substantially the same as the components of FIG. 2B, and thus a redundant description is omitted.

The case 102 includes the inner space 102a formed with both surfaces. For example, the first circuit board 181 may be disposed on one surface facing the display unit 151, and a second circuit board 182 and the power supply unit 190 may be disposed on an opposite surface facing the rear cover 103.

The power supply unit 190 according to this embodiment may be disposed on a rear surface of the case 102 so as to be covered with the rear cover 103. In this case, the power supply unit 190 may be detachably mounted to the case 102.

A finger scan module 142 is disposed on the first circuit board 181.

A first heat dissipation member 105a is disposed between the first circuit board 181 and the display unit 151. The first heat dissipation member 105a is formed in a film or plate shape corresponding to the display part 151. The first heat dissipation member 105a may be made of a PU sheet, a graphite sheet, a metal layer, or the like.

The first heat dissipation member 105a includes an opening area 105a' through which the finger scan module 142 is disposed adjacent to the display unit 151. The finger scan module 142 may be disposed adjacent to the display module through the opening area 105a', to detect a fingerprint of a finger touching the window.

In addition, the second heat dissipation member 105b may have a shape extending in one direction to be brought into contact with a thermal conductive material. The second heat dissipation member 105b may allow for dissipation of heat which is generated in a specific area where much heat is generated.

The first assembly may further include a first camera 121a and a first audio output module 152a disposed on a front surface of the electronic device 100. Also, the electronic components included in the first assembly may not be limited thereto. Although not illustrated, the first assembly may further include a pressure touch sensing layer for sensing a pressure touch over reference pressure.

The electronic device 100 according to FIG. 3B includes a first assembly having a support frame 101 and a display unit, a second assembly having a case 102, a first circuit substrate 181 and a power supply 190, and a rear cover 103.

The components of the electronic device 100 according to this embodiment are substantially the same as the components of the electronic device 100 of FIG. 2A except for the position of the inner space of the case 102 and the rear cover 103, and thus a redundant description will be omitted.

The inner space of the case 102 is formed to face the rear cover 103. That is, the first assembly is mounted on one surface of the case 102. A finger scan module 142 may be disposed between the case 102 and the display unit 151. Although not illustrated, the case 102 may include an accommodating groove for accommodating and supporting the finger scan module 142.

First and second cameras 121a and 121b, first and second audio output modules 152a and 152b, a first circuit board 181, and a power supply unit 190 are disposed in the inner space of the case 102.

The rear cover 103 is mounted on the case 102 so as to cover the inner space 102a. According to one embodiment, the case 102 and the rear cover 103 may be fixed so as not to be separated from each other. That is, the electronic device 100 may have an integral body from which the power supply unit 190 is not detached.

The first assembly may further include the first camera 121a and the first audio output module 152a disposed on a front surface of the electronic device 100. Also, the electronic components included in the first assembly may not be limited thereto. Although not illustrated, the first assembly may further include a pressure touch sensing layer for sensing a pressure touch over reference pressure.

In addition, the second assembly may include a heat dissipation unit for externally dissipating heat generated in the electronic device 100. For example, the heat dissipation unit may be made of at least one of a graphite sheet, a PU sheet, and a metal plate.

The electronic device according to the present invention includes the pressure touch sensing layer for sensing a pressure touch input, the finger scan module, and the heat dissipation unit. In addition, the user input unit inserted through the window is removed, and thus a specific function can be performed using the finger scan module.

The finger scan module is disposed adjacent to the display unit through the pressure touch sensing layer and the heat dissipation unit. Hereinafter, the structure of the finger scan module will be described.

Figure 4A:
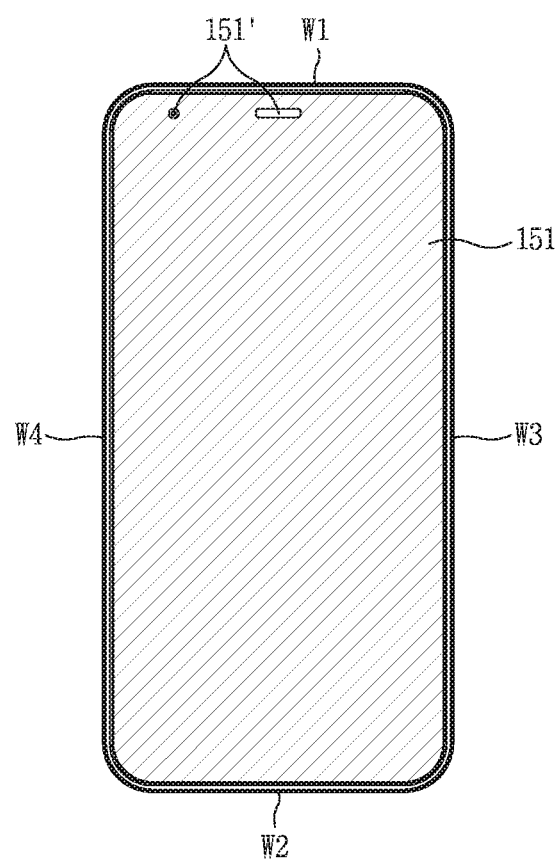
FIGS. 4A and 4B are conceptual views illustrating an opening area of a pressure touch sensing layer.
Figure 4B:
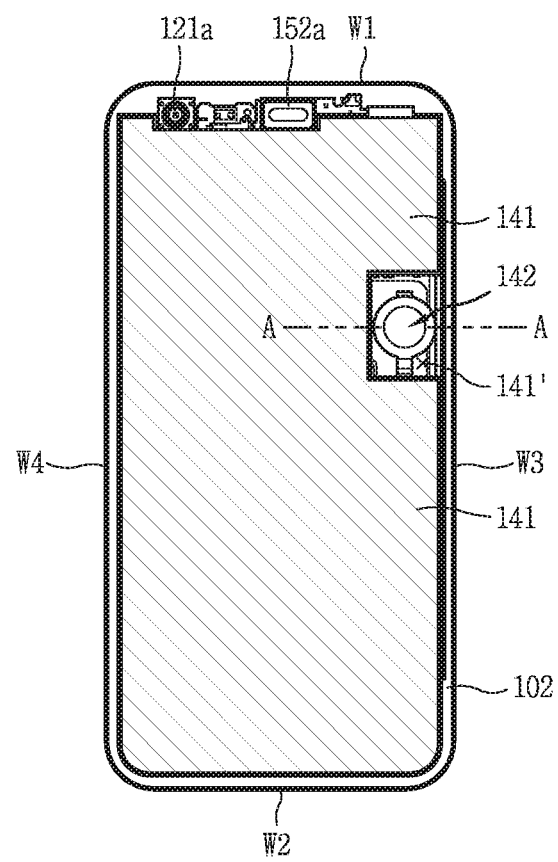

FIGS. 4A and 4B are conceptual views illustrating an opening area of a pressure touch sensing layer.

The case 102 forms side surfaces of the electronic device 100. The electronic device 100 includes first and second side surfaces w1 and w2 facing each other and third and fourth side surfaces w3 and w4 facing each other and intersecting with the first and second side surfaces w1 and w2. The first camera 121a and the first audio output module 152a may be disposed on the first side surface w1 to be adjacent to each other.

The display unit 151 coupled to the case 102 defines a front surface of the electronic device 100. A window according to one embodiment of the present invention covers the entire front surface of the electronic device 100. The display unit is disposed beneath the window.

FIG. 4B is a conceptual view illustrating the pressure touch sensing layer 141 and the finger scan module 142 arranged below the display unit 151. The finger scan module 142 may be disposed adjacent to the third side surface w3. The pressure touch sensing layer 141 has a shape corresponding to the display unit 151, but includes an opening area 141' formed in an area corresponding to the finger scan module 142.

The finger scan module 142 may be exposed through the opening area 141' to be disposed adjacent to the display unit 151. The opening area 141' is formed by being recessed from one edge of the pressure touch sensing layer 141 adjacent to the third side surface w3.

The pressure touch sensing layer 141 senses pressure of a pressure touch applied to the window. However, the pressure touch sensing layer 141 may not sense pressure applied to one area on the window corresponding to the opening area 141'.

Hereinafter, components of an electronic device according to one embodiment of the present invention will be described.

Figure 5A:
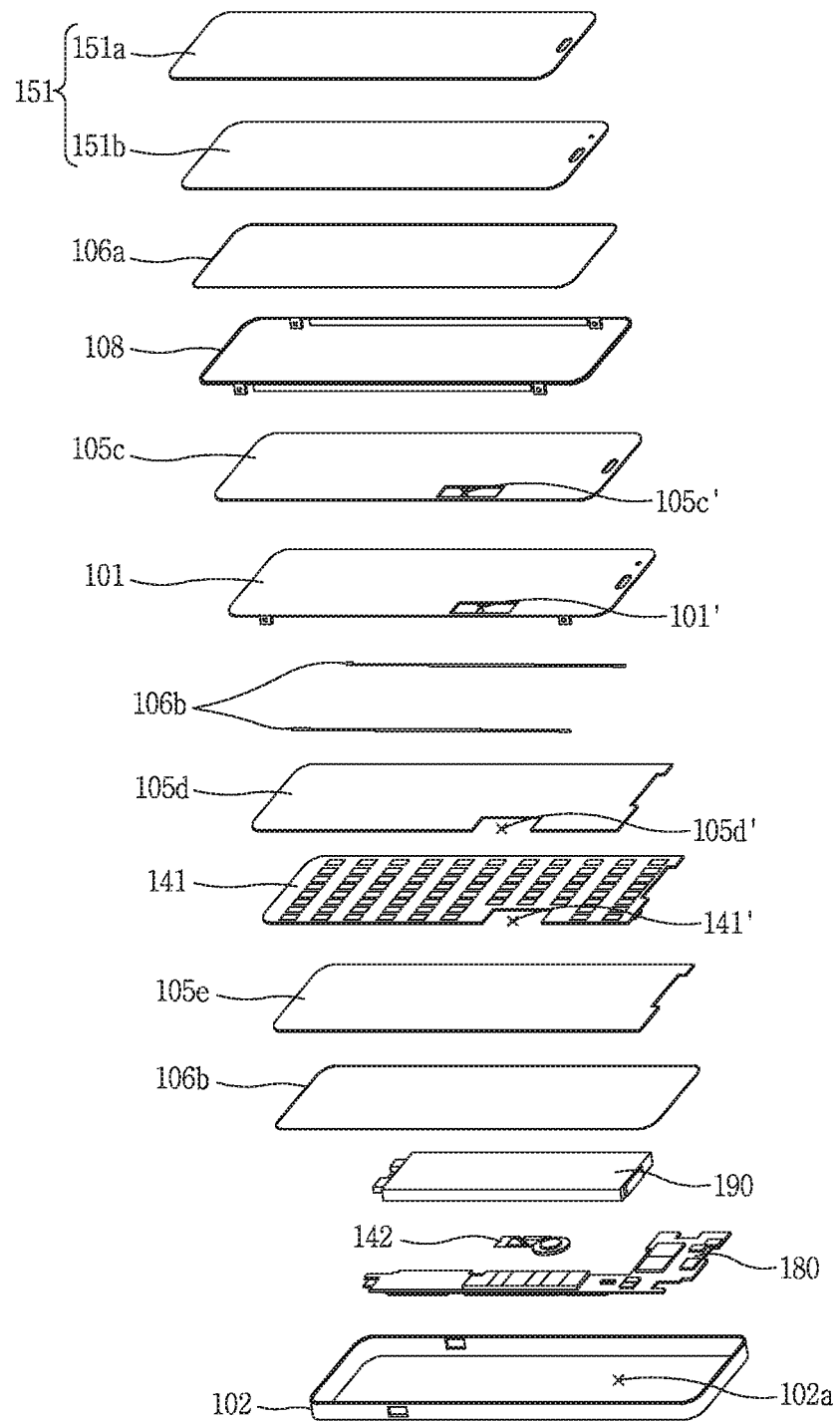
FIG. 5A is an exploded view of an electronic device in accordance with one embodiment of the present invention.
Figure 5B:
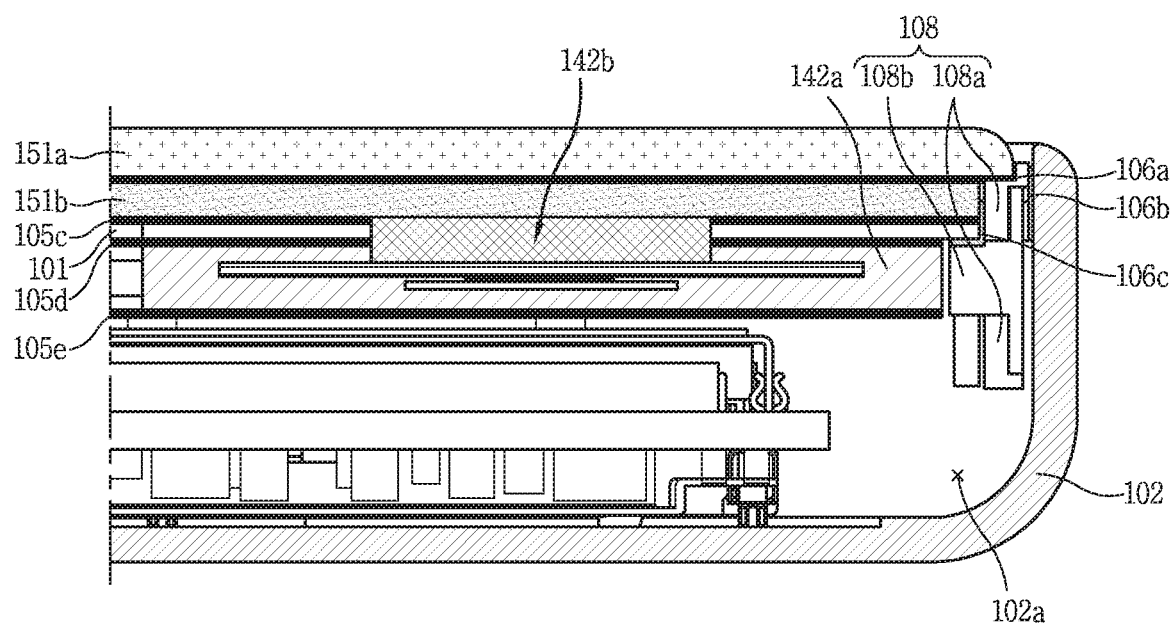
FIG. 5B is a sectional view taken along the line A-A of FIG. 4B.
Figure 5C:
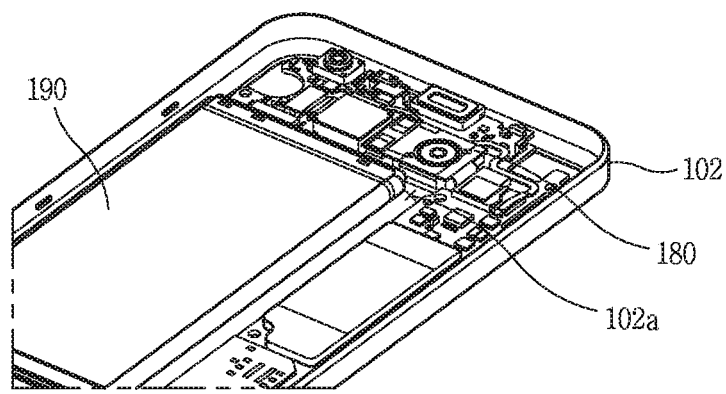
FIG. 5C is a conceptual view illustrating assembling of a finger scan module and a pressure touch sensing layer.
Figure 5C:
Figure 5C:
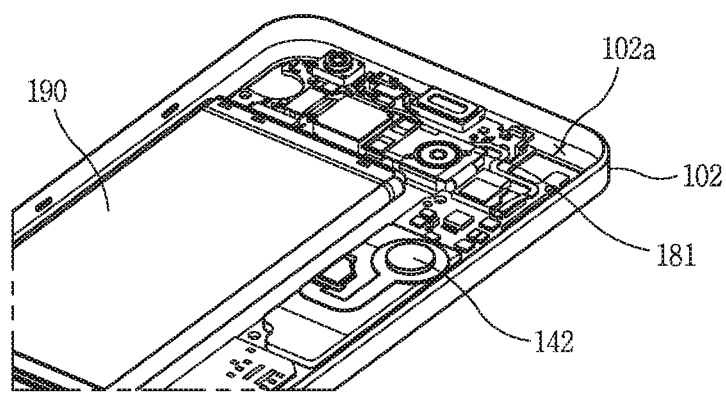
Figure 5C:
Figure 5C:
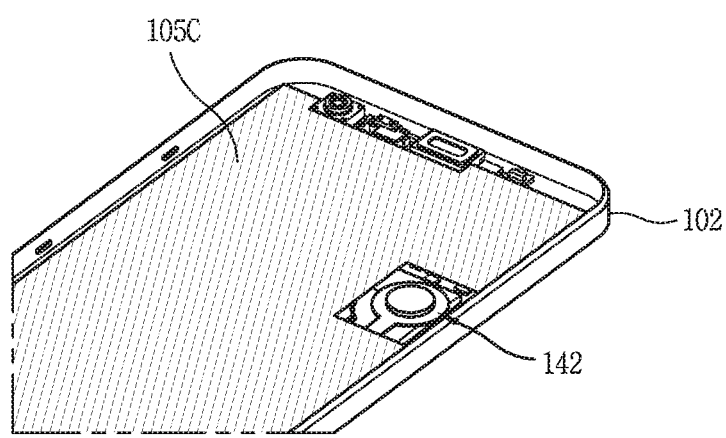

FIG. 5A is an exploded view of an electronic device according to one embodiment of the present invention, FIG. 5B is a cross-sectional view taken along line A-A of FIG. 4B, and FIG. 5C is a conceptual view illustrating assembling of a finger scan module and a pressure touch sensing layer.

Referring to FIGS. 5A and 5B, the electronic device 100 includes a display unit 151 provided with a window 151a and a display module 151b, first and second waterproof members 106a and 106b, a guide frame 108 fixing the display module 151b, a support frame 101, an adhesive member 106c, first and second graphite sheets 105c, 105d and 105e, a pressure touch sensing layer 141, a finger scan module 142, a power supply unit 190, and a circuit board 180.

The case 102 has an inner space 102 in which the circuit board 180 and the power supply unit 190 are disposed. The power supply unit 190 is preferably disposed on one area of the inner space 102 and the circuit board 180 on the remaining area, so that the power supply unit 190 and the circuit board 180 cannot overlap each other.

The guide frame 108 is formed along an edge of the display module 151b. The guide frame 108 and the support frame 101 are coupled to each other. The guide frame 108 includes a mold portion 108a formed of a mold member and a metal portion 108b disposed on an inner circumferential surface of the mold portion 108a. The metal portion 108b is formed in an area adjacent to the third side surface.

After the display module 151b, the first graphite sheet 105c, the support frame 101, the second graphite sheet 105d, the pressure touch sensing layer 141 are sequentially laminated on one another, the guide frame 108 surrounds side surfaces of the laminated layers. The window 151a is disposed on the display module 151b fixed by the guide frame 108.

The window 151a is bonded to the guide frame 106 by the first waterproof member 106a. Accordingly, an introduction of water between the window 151a and the guide frame 106 can be prevented.

Meanwhile, the second waterproof member 106b is disposed between the guide frame 108 and the case 102. By virtue of the second waterproof member 106b, the display unit 151, the pressure touch sensing layer 141 and a heat dissipation structure may be fixed to the case 102, and an introduction of water into the case 102 can be prevented.

The third waterproof member 106c is formed to correspond to the metal portion 108b and adheres the support frame 101 to the metal portion 108a.

One area of the finger scan module 142 may be inserted through the first and second graphite sheets 105c and 105d, the support frame 101 and the pressure touch sensing layer 141, so as to be arranged adjacent to the display module 151b.

The finger scan module 142 includes a support mold 142a and a finger scan sensor 142b mounted on the support mold 142a. The support mold 142a may be disposed adjacent to the metal portion 108b.

The first and second graphite sheets 105c and 105d and the support frame 101 include first to third through holes 105c', 105d' and 101' through which the finger scan sensor 142b is inserted. The first to third through holes 105c', 105d' and 101' have substantially the same size.

Meanwhile, the pressure touch sensing layer 141 includes an opening area 141'. The opening area 141' communicates with the first to third through holes 105c', 105d' and 101' and is larger than the first to third through holes 105c', 105d' and 101'. The finger scan module 142 including the support mold 142a is disposed in the opening area 141'.

On the other hand, when the third graphite sheet 105e is disposed below the finger scan module 142, the opening area does not need to be formed. However, when the third graphite sheet 105e is disposed immediately beneath the pressure touch sensing layer 141, the third graphite sheet 105e should include the opening area.

Referring to FIG. 5C, the circuit board 180 and the power supply unit 190 are disposed within the inner space 102a. The finger scan module 142 is disposed on one area of the circuit board 180.

The pressure touch sensing layer 141 and the first and second graphite sheets 105c and 105d having the opening area are disposed in a manner of exposing the finger scan module 142 therethrough. The display unit 151 is disposed on the first graphite sheet 105c.

Figure 6:
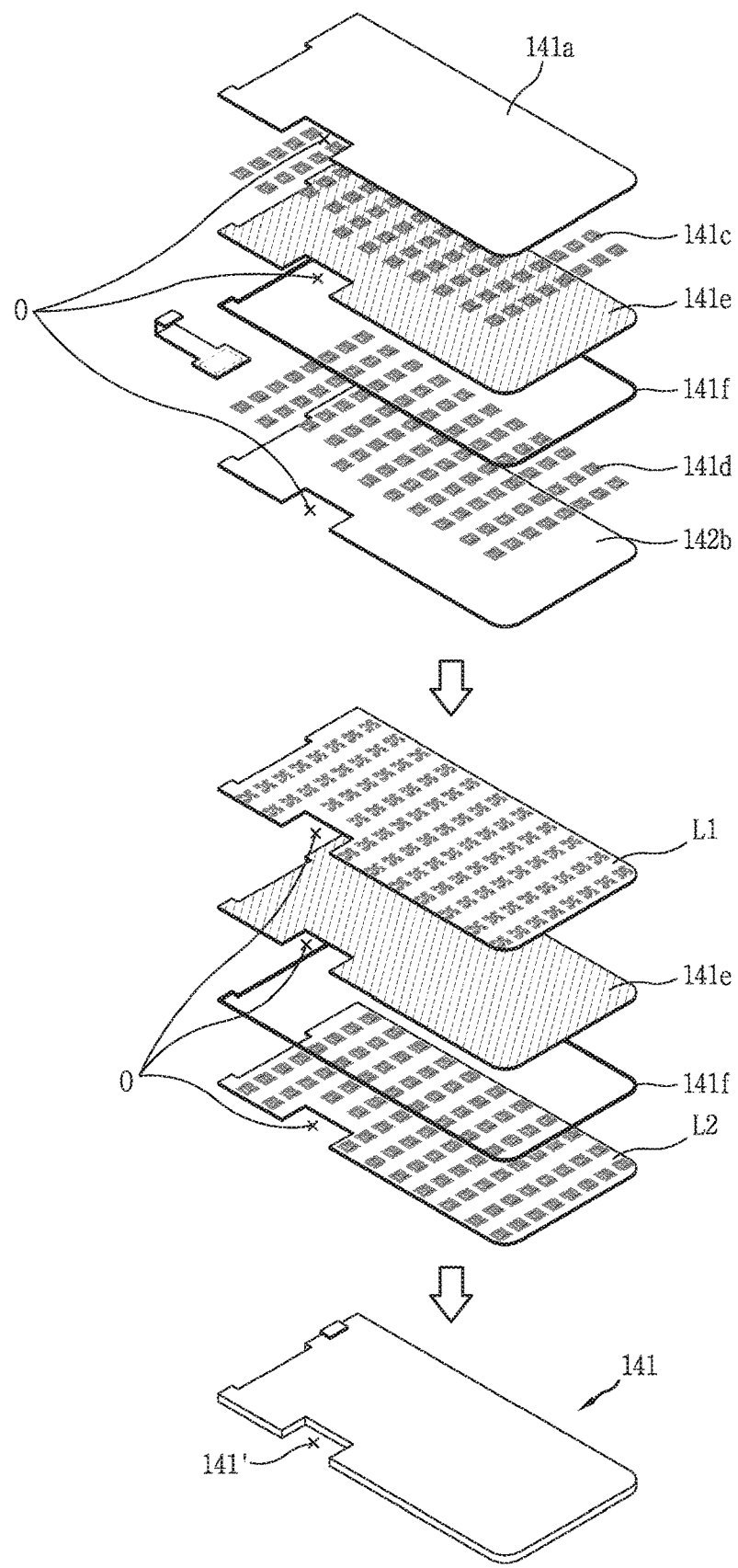
FIG. 6 is a conceptual view illustrating a method of fabricating a pressure touch sensing layer.

FIG. 6 is a conceptual view illustrating a method of fabricating the pressure touch sensing layer.

Referring to FIG. 6, the pressure touch sensing layer 141 includes first and second base substrates 141a and 141b having substantially the same shape. Each of the first and second base substrates 141a and 141b includes a recess O.

First and second electrode layers 141c and 141d are formed on the first and second base substrates 141a and 141b, respectively. The first and second electrode layers 141c and 141d are not formed in the recesses O. An insulating layer (PET) 141e is disposed between the first and second base substrates 141a and 141b on which the first and second electrode layers 141c and 141d are formed. The insulating layer 141e also includes the recess O.

The first and second base substrates 141a and 141b and the insulating layer 141e are surrounded by a guide mold 141f having a specific shape. Patterns of the first and second electrode layers 141c and 141d may be aligned by the guide mold 141f.

The pressure touch sensing layer 141 having the opening area 141' may be formed by the recesses O of the first and second base substrates 141a and 141b and the insulating layer 141e.

Figure 7A:
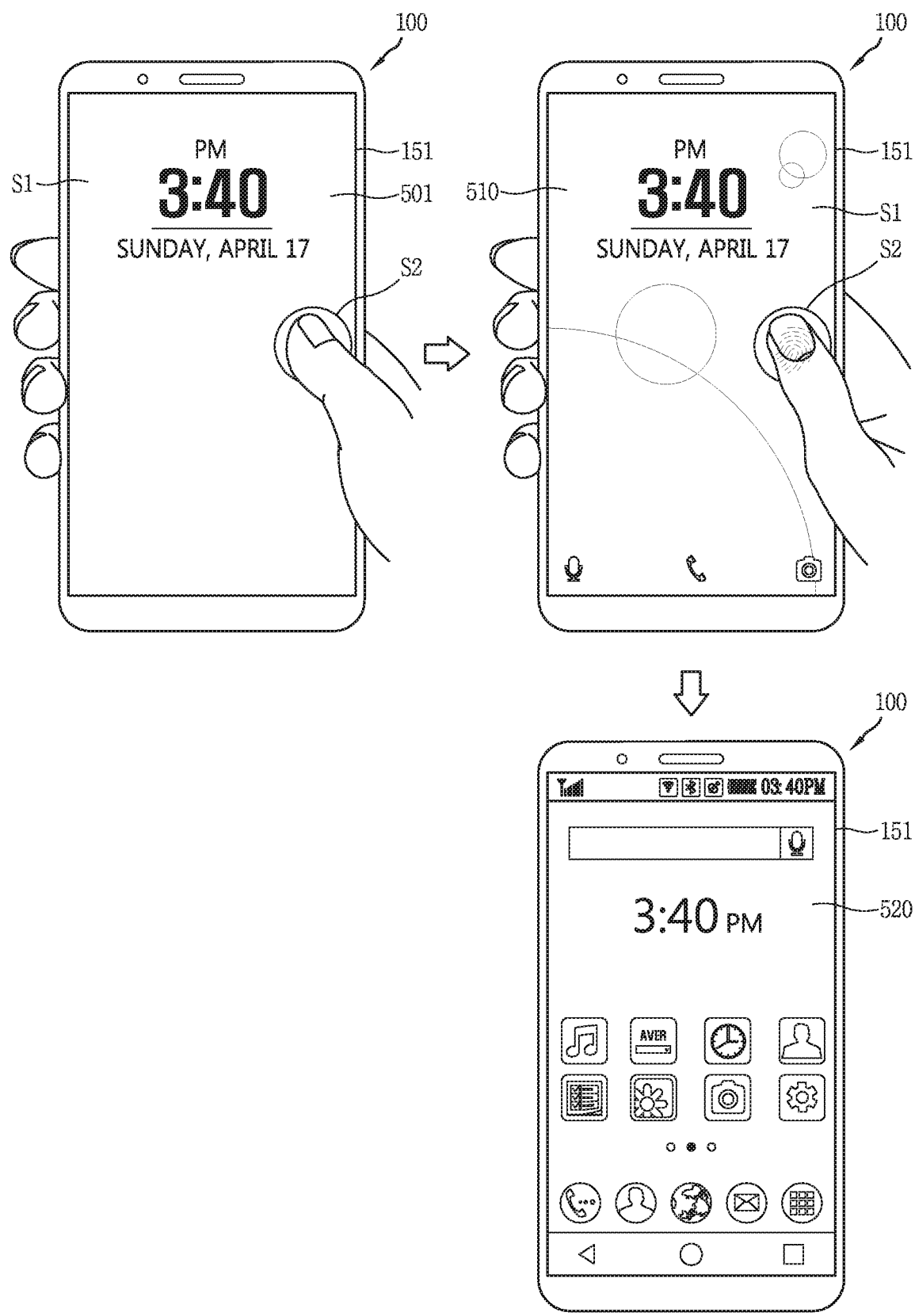
FIGS. 7A to 7C are conceptual views illustrating a method of controlling an electronic device in accordance with one embodiment of the present invention.
Figure 7B:
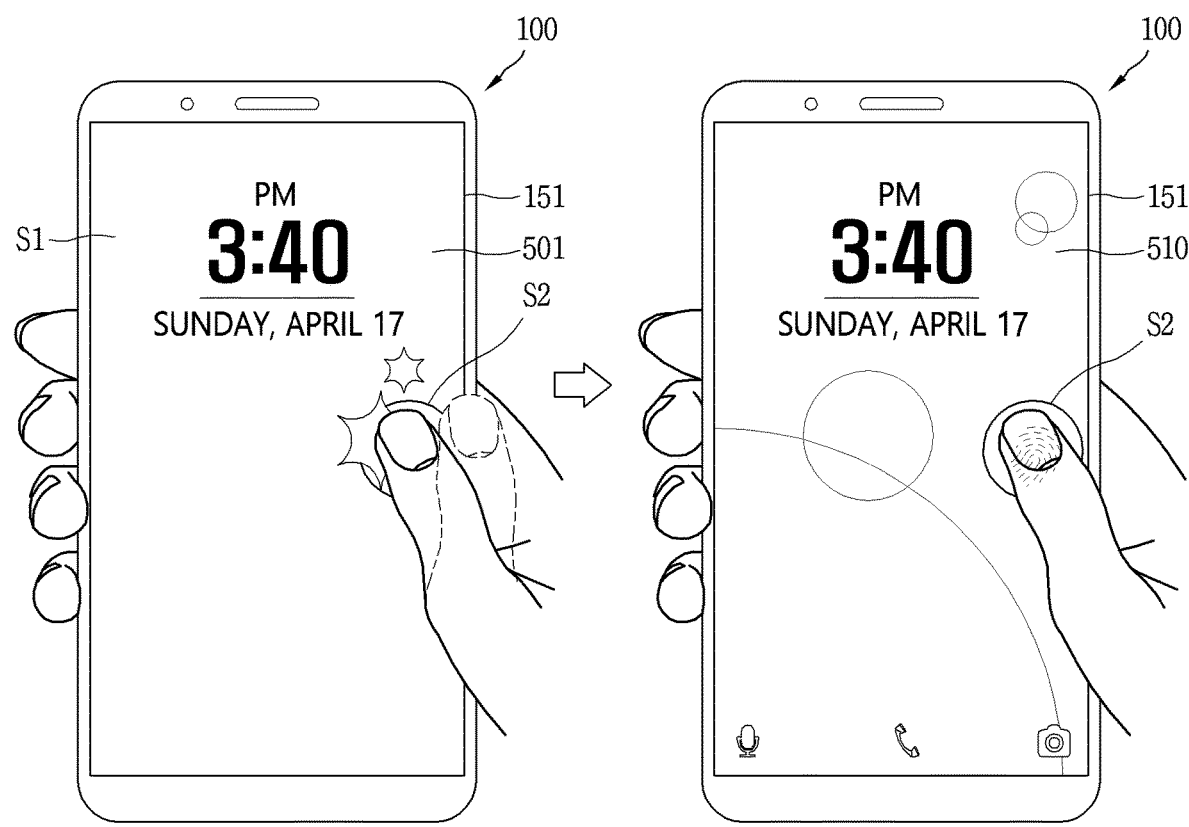
Figure 7C:
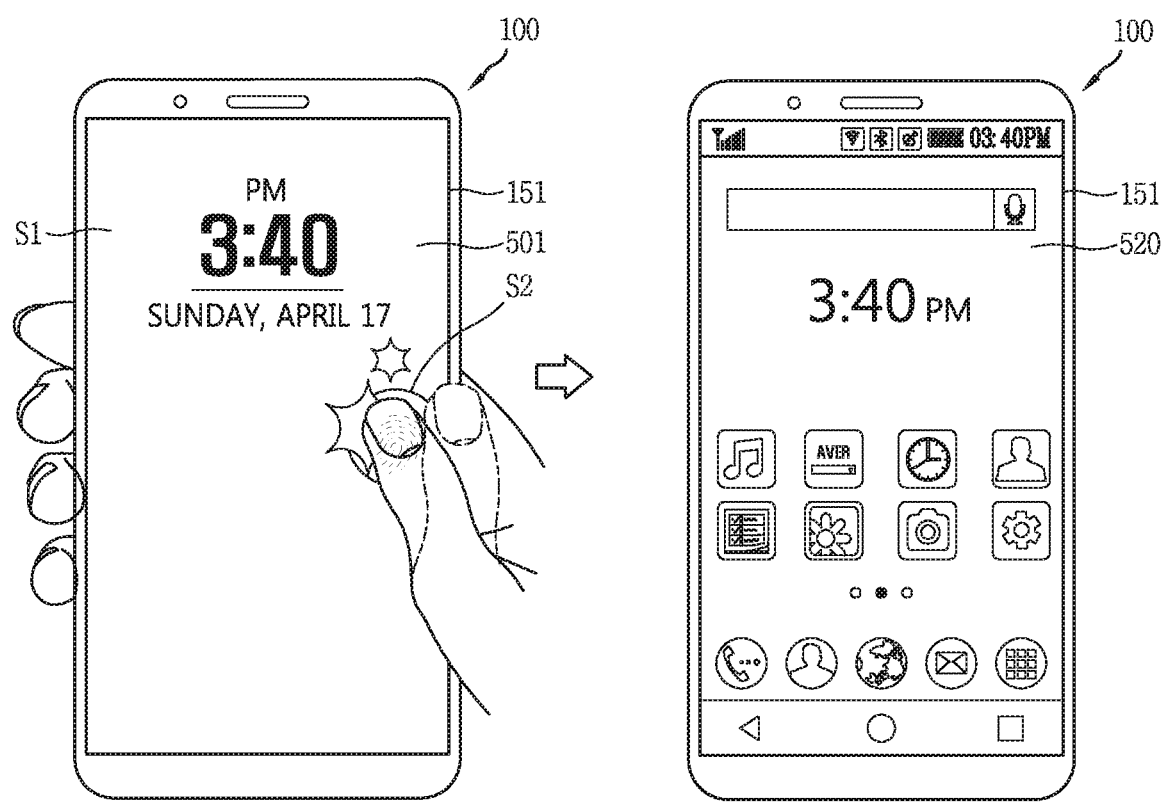

FIGS. 7A and 7C are conceptual views illustrating a method of controlling an electronic device according to one embodiment of the present invention.

Referring to FIG. 7A, the electronic device 100 may detect a touch input and a pressure touch input applied on the display unit 151, and acquire fingerprint information on a specific area. The pressure touch may not be detected on the specific area from which the fingerprint information can be acquired. That is, the display unit 151 may be divided into a first area 51 for receiving a pressure touch and a second area S2 for obtaining fingerprint information.

FIG. 7A illustrates an image (an always-on display) 501 that is continuously displayed in a lock state and in an inactive state of the display unit 151. However, the present invention is not limited to this state, and may equally be applied even in an inactive state in which no image is displayed on the display unit 151.

In this state, a touch sensor is activated in a manner that a touch input is received on the first area S1 but is not received on the second area S2.

When a touch input is applied to the second area S2 of the display unit 151, the controller of the electronic device 100 activates the finger scan module 142. The finger scan module 142 obtains fingerprint information from a finger which is brought into contact with the second area S2.

The controller may release the lock state after performing an authentication procedure in a case where the fingerprint information does not match pre-stored fingerprint information. The display unit 151 outputs specific screen information 520.

On the other hand, when a touch input is received in the second area S2, the display unit 151 outputs a lock screen 510. In this case, a touch detection in the first area S1 is activated and a touch detection in the second area S2 is deactivated. Accordingly, the lock state may be released by applying a touch input to the first area S1.

Referring to FIG. 7B, in the inactive state of the display unit 151, the touch detection is deactivated in the first area S1, and the touch detection is activated in the second area S2. Accordingly, when a knock input is applied to the second area S2, the controller outputs the lock screen 510 and controls the touch detection of the first area S1 to be activated. Also, when the lock screen 510 is output, finger scanning of the second area S2 may be activated.

Referring to FIG. 7C, the controller controls the finger scan module 142 to acquire fingerprint information from a finger touching the second area S2 when a knock input is applied to the second area S2. Accordingly, when the authentication procedure is performed, the lock state is released and the specific screen information 520 is output.

Figure 8A:
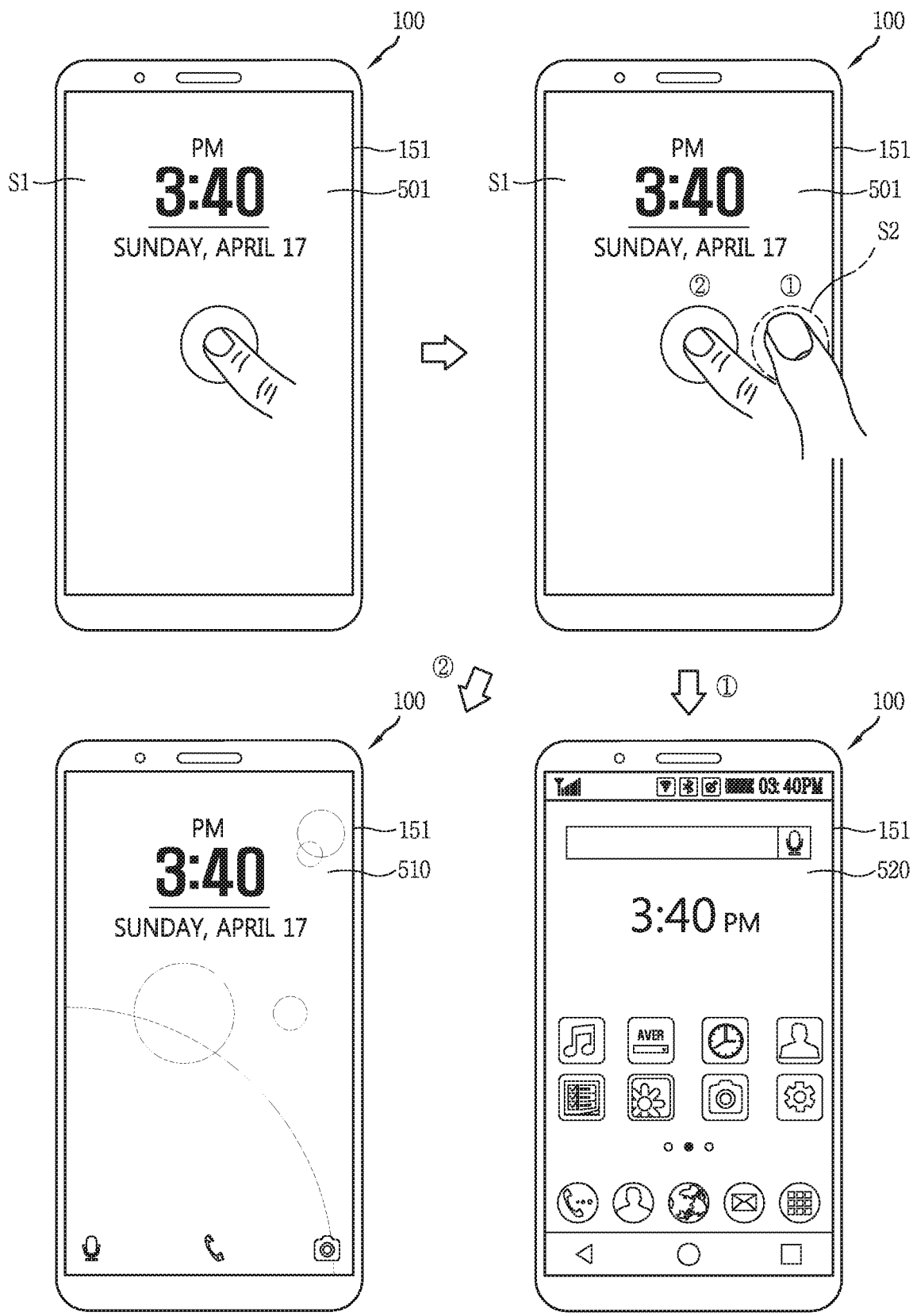
FIGS. 8A to 8C are conceptual views illustrating a method of controlling an electronic device in accordance with another embodiment of the present invention.
Figure 8B:
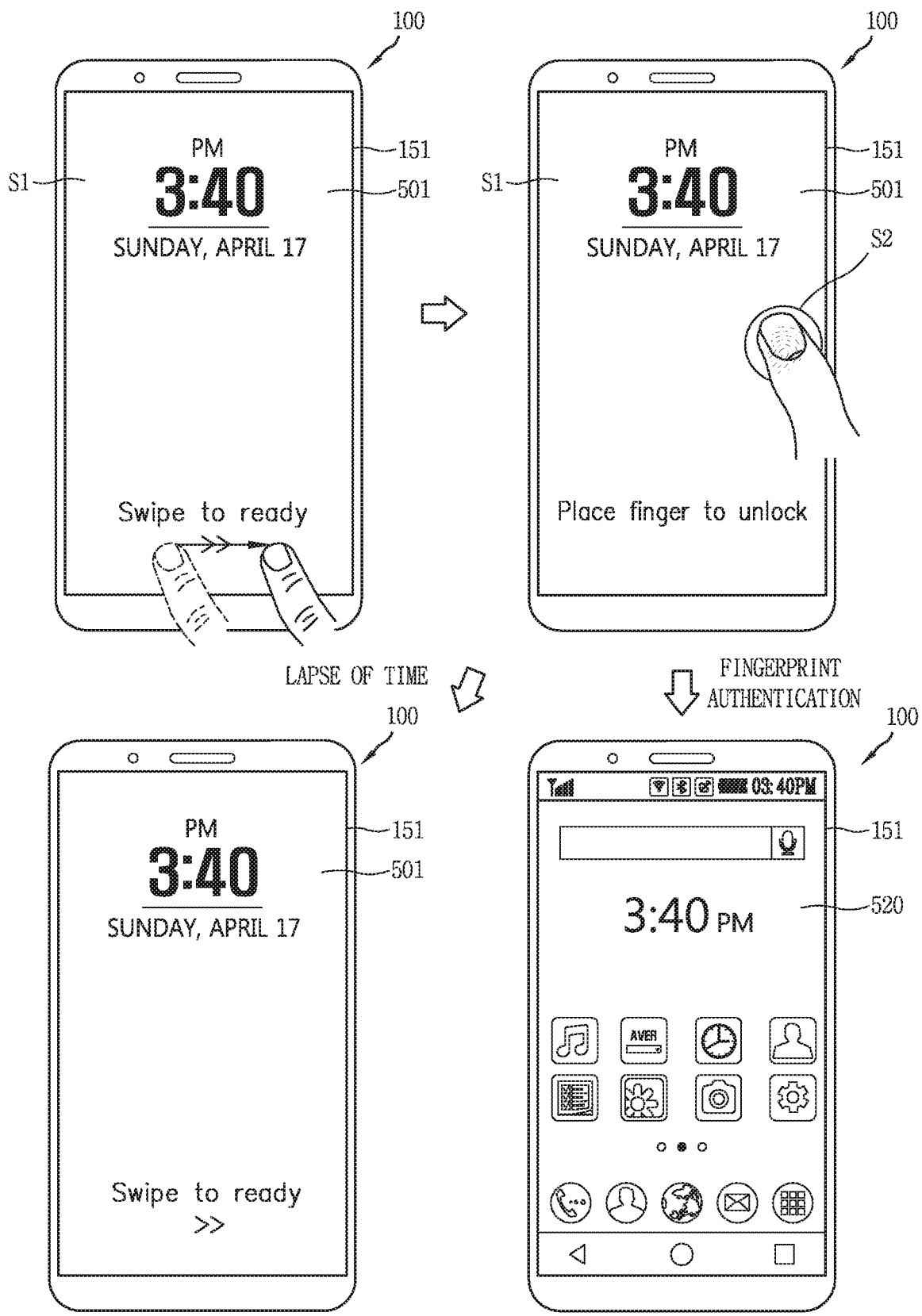
Figure 8C:
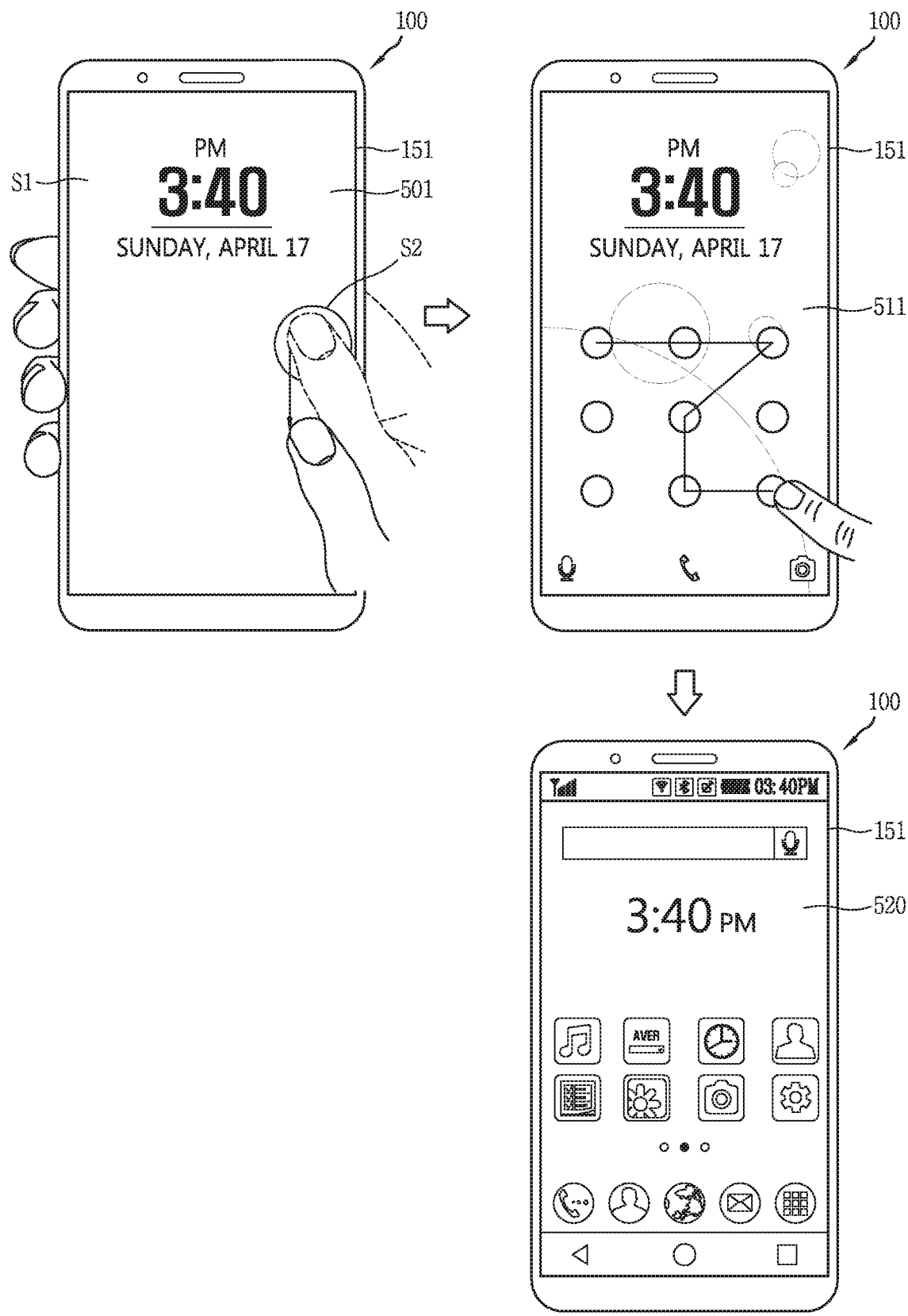

FIGS. 8A and 8C are conceptual views illustrating a method of controlling an electronic device according to another embodiment of the present invention.

Referring to FIG. 8A, the controller activates the touch detection of the second area S2 based on a touch applied to the first area S1. When a fingerprint is detected in the first area S1, the controller performs the authentication procedure to release the lock state.

On the other hand, when a touch input is detected in the second area S2, the lock screen 510 is output to receive information for releasing the lock state. The user may input a touch input or a knock input (code) on the lock screen 510 to input a password for releasing the lock state.

Referring to FIG. 8B, when a specific touch input is applied to the first area S1 in the inactive state of the display unit 151, the controller activates the finger scanning of the second area S2. In this case, the touch detection of the first and second areas S1 and S2 is maintained in the inactive state.

When fingerprint information is obtained from a finger touching the second area S2, the controller performs the authentication procedure and releases the lock state. However, when any finger is not brought into contact with the second area S2 for a specific period of time, the controller controls the finger scan module 142 to deactivate the finger scanning.

Referring to FIG. 8C, when a specific touch input is applied to the second area S2 in the inactive state of the display unit 151, the display unit 151 outputs a preset lock screen 511. The lock screen 511 corresponds to the specific touch input, and may correspond to, for example, a screen for inputting a pattern through a touch input.

However, the present invention is not limited thereto. When a specific touch input is applied to the second area S2, the authentication procedure may be performed by acquiring fingerprint information or voice information.

Figure 9:
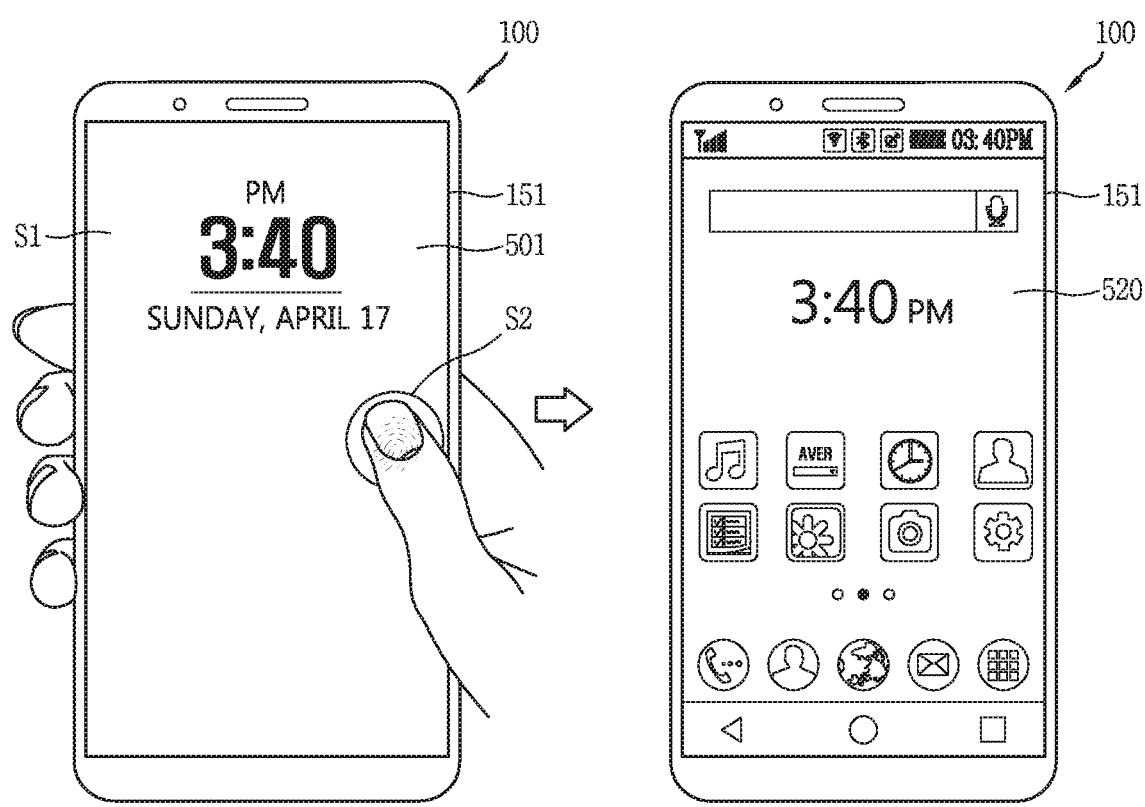
FIG. 9 is a conceptual view illustrating a method of controlling an electronic device in accordance with another embodiment.

FIG. 9 is a conceptual view illustrating a method of controlling an electronic device according to another embodiment.

The pressure touch sensing layer 141 according to FIG. 9 may detect that a pressure touch has been applied to the second area S2 based on pressure sensed in a surrounding area of the opening area 141'.

Therefore, when a pressure touch is applied to the second area S2, a pressure change is sensed by one area of the pressure touch sensing layer 141 corresponding to the surrounding area of the second area S2, and it is determined that the pressure touch has been applied to the second area S2 based on the sensed area of the pressure change.

When it is determined that the pressure touch has been applied to the second area S2, the controller controls the finger scan module 142 to acquire fingerprint information.

Figure 10:
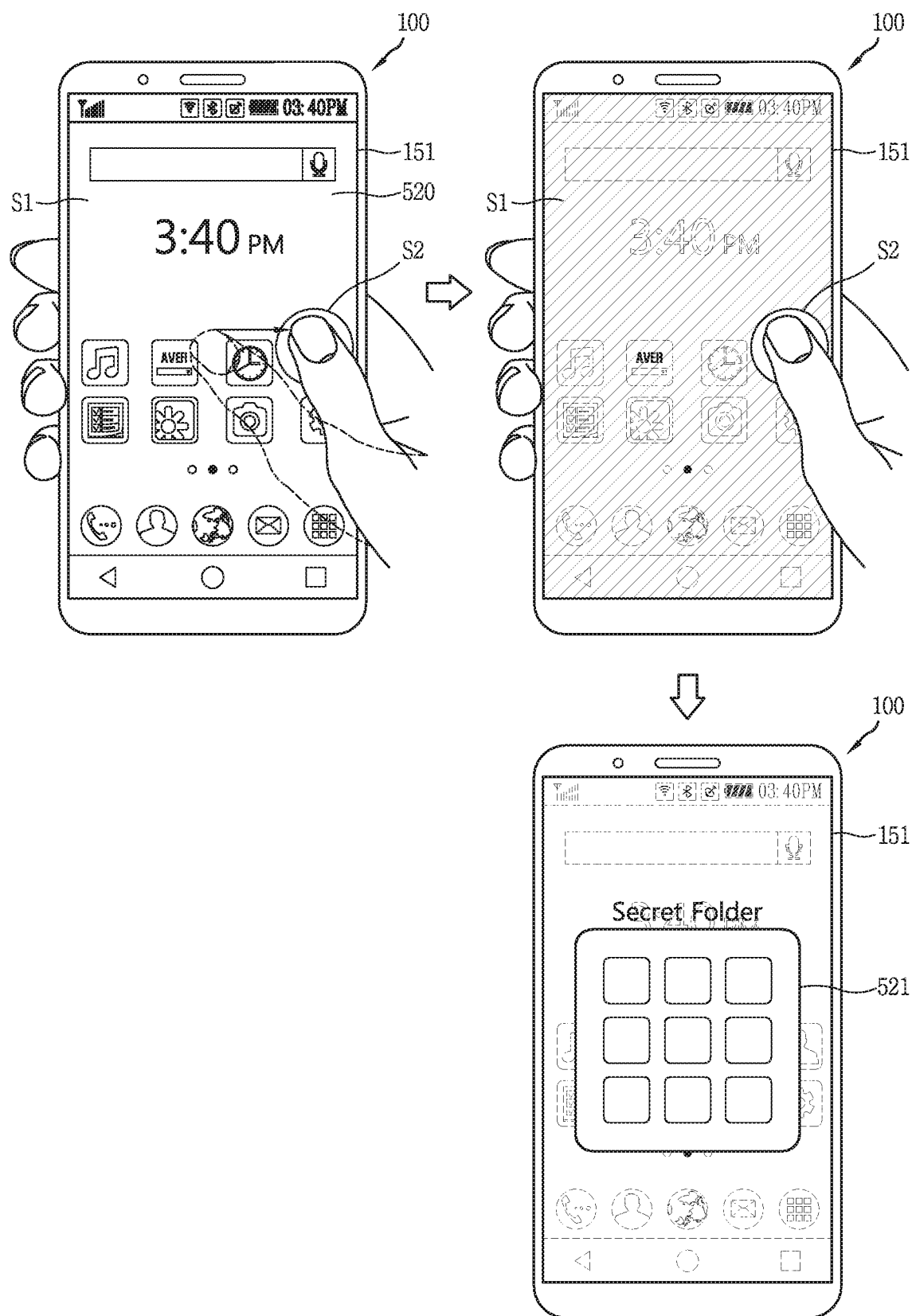
FIG. 10 is a conceptual view illustrating a method of controlling an electronic device in accordance with another embodiment.

FIG. 10 is a conceptual view illustrating a method of controlling an electronic device according to another embodiment.

Referring to FIG. 10, when a touch input that moves from the first area S1 to the second area S2 is applied while the specific screen information 520 is displayed, the controller may activate the finger scan module 142. For example, when a pressure touch is sensed in the first area S1 and a touch input consecutive to the pressure touch is sensed in the second area S2, the controller may activate the finger scan module 142.

That is, the control based on the pressure touch may be distinguished from a control based on a continuous general touch input moving from the first area S1 to the second area S2.

The controller controls the display unit to output specific data 521 in a lock state or the electronic device enters a specific mode which has been set to a lock state, based on fingerprint information detected by the finger scan module 142. However, the present invention is not limited thereto, and the controller may perform a specific function based on the fingerprint information.

According to the embodiments, a specific function can be performed even when there is no button, through the finger scan module disposed in one area of the display unit.

Figure 11A:
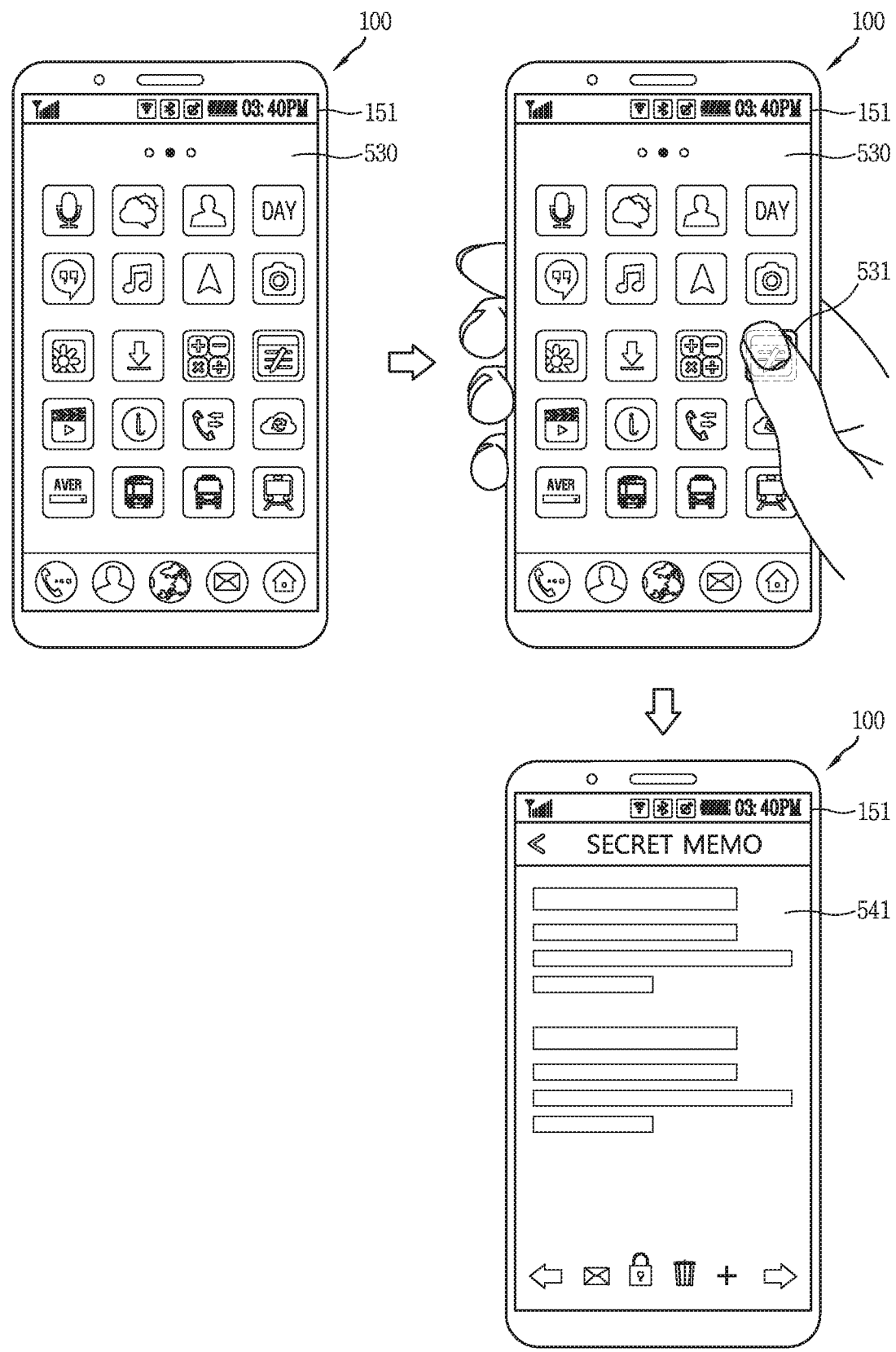
FIGS. 11A and 11B are conceptual views illustrating a method of controlling an electronic device in accordance with another embodiment.
Figure 11B:
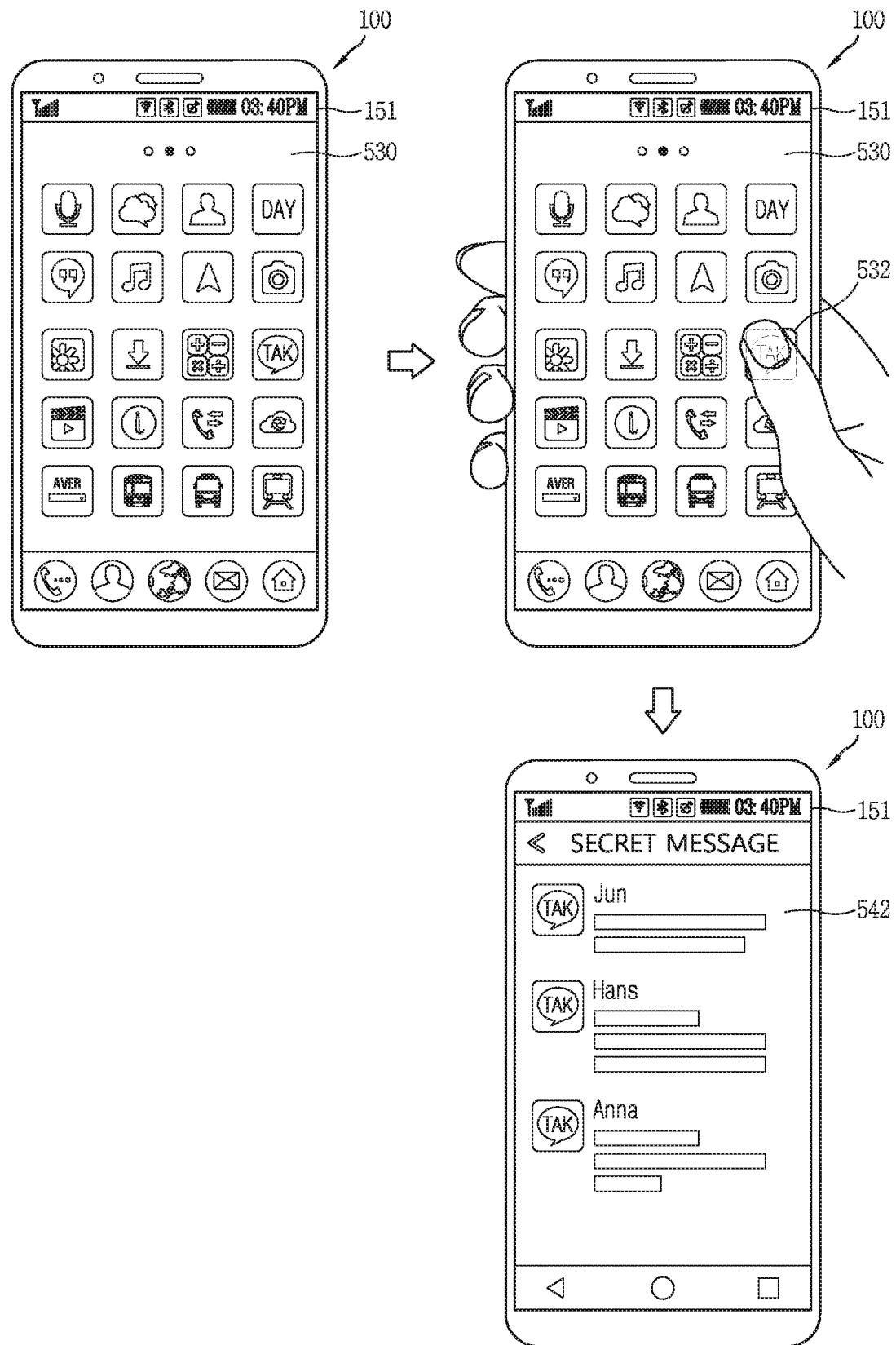

FIGS. 11A and 11B are conceptual vies illustrating a method of controlling an electronic device according to another embodiment of the present invention.

Referring to FIG. 11A, the display unit 151 outputs screen information 530 including a plurality of icons for executing applications. When a touch input is applied to a first icon 531 displayed in a specific area on the display unit 151, the controller executes an application corresponding to the first icon 531 and outputs an execution screen. Here, the touch input corresponds to a general touch input having pressure lower than a specific reference pressure (or without having touch pressure), and in this case, the finger scan module 142 is not activated.

Meanwhile, when a pressure touch input is applied to the first icon 531, the controller executes the application and outputs lock state-related information 541. The area of the pressure input sensing layer 141 adjacent to the finger scan module 142 may sense the touch pressure applied to the specific area. That is, when the touch pressure is sensed by the pressure input sensing layer 141, fingerprint information is acquired by the finger scan module 142. The controller performs an authentication procedure based on the fingerprint information.

The lock state-related information, for example, corresponds to information stored together with a password, in a memory allocated to an application, and the controller may output the information 541 when an additional password is input after the application is executed. The information 541 may correspond to a secret memo stored through a memo application.

Accordingly, the user can perform the authentication procedure in response to the execution, without needing an input of an additional password or the like.

FIG. 11B is a conceptual view illustrating a control method regarding an execution of a message application.

Referring to FIG. 11B, a second icon 532 included in screen information 530 is output in a specific area of the display unit 151. Here, the specific area corresponds to an area corresponding to the finger scan module 142, and the pressure touch sensing layer 141 may sense a pressure touch applied to the specific area.

A message application is activated based on a touch input applied to the second icon 532, and the finger scan module 142 is activated based on the pressure touch. The controller performs an authentication procedure based on the fingerprint information sensed by the finger scan module 142.

When the authentication procedure is performed based on the fingerprint information, the information 542 stored in the memory allocated to the message application together with the password is output on the display unit 151.

Figure 12:
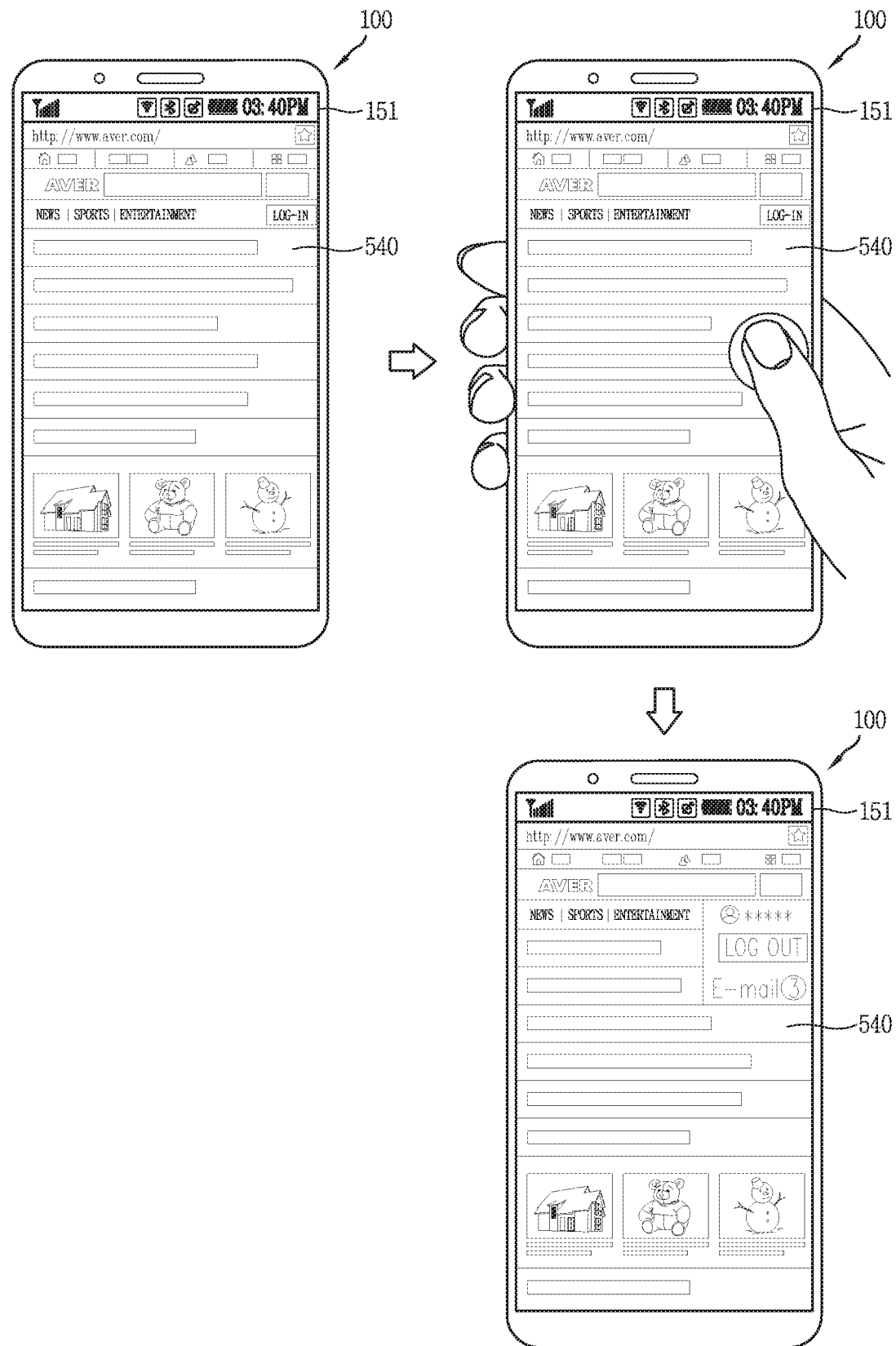
FIG. 12 is a conceptual view illustrating a method of controlling an electronic device in accordance with another embodiment.

FIG. 12 is a conceptual view illustrating a method of controlling an electronic device according to another embodiment.

Referring to FIG. 12, the display unit 151 outputs a web page 540. The display unit 151 may change an output area of the web page, output another web page, and perform an additional function, based on a touch input applied to the web page 540.

Meanwhile, when a touch input is applied to a specific area of the display unit 151 corresponding to the finger scan module 142, the controller acquires fingerprint information by the finger scan module 142. And the controller performs a login function of the web page based on the fingerprint information. The controller may perform the login function to the web page by using login information stored in the memory together with the fingerprint information.

However, when a pressure touch is sensed in one area of the pressure touch sensing layer 141 adjacent to the finger scan module 142, the controller may activate the finger scan module 142 to acquire fingerprint information.

According to this embodiment, the user can input login information without having to input text or the like on a web page.

Figure 13A:
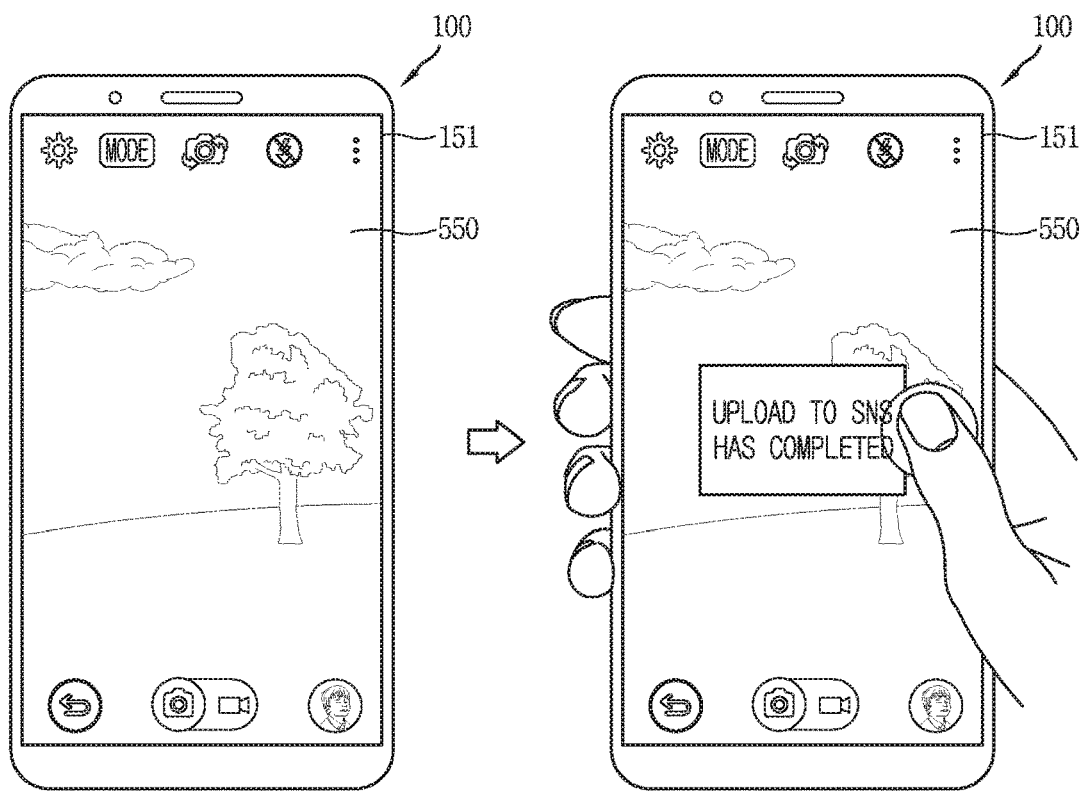
FIGS. 13A and 13B are conceptual views illustrating a control method of executing an additional function using fingerprint information.
Figure 13B:
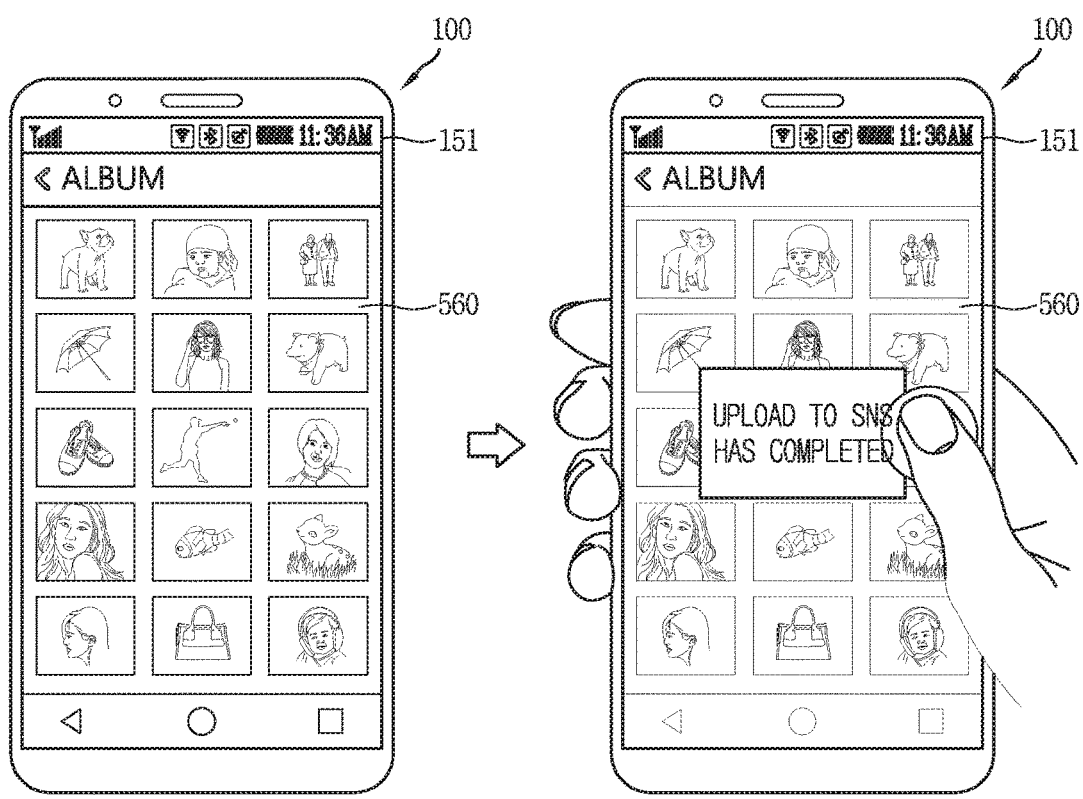

FIGS. 13A and 13B are conceptual views illustrating a control method of performing an additional function using fingerprint information.

Referring to FIG. 13A, the display unit 151 outputs a preview image 550 obtained by a camera. The controller may control the camera to acquire and store the preview image 550 based on a specific control command.

Meanwhile, when a pressure touch is applied to a specific area on the display unit corresponding to the finger scan module 142, the pressure touch sensing layer 141 senses the pressure touch, and the controller activates the finger scan module 142 to acquire fingerprint information.

The controller logs in a specific server based on the fingerprint information acquired by the finger scan module 142 and uploads the image acquired by the camera to the specific server at a time point when the pressure touch is applied. The image uploaded to the specific server may be stored in the memory based on a user setting.

Accordingly, the user can perform even the upload function to the server in an activated state of a capturing application, without complicated steps of capturing an image, accessing and logging in a specific server (e.g., a social network service (SNS)), and uploading the captured image.

Referring to FIG. 13B, the display unit 151 outputs screen information (for example, an execution screen of a gallery application) including thumbnail images of images stored in the memory.

When a pressure touch is applied to a specific area on the display unit corresponding to the finger scan module 142 in the output state of the thumbnail images, the pressure touch sensing layer 141 senses the pressure touch, and the controller activates the finger scan module 142 to acquire fingerprint information.

The controller logs in a specific server based on the fingerprint information acquired by the finger scan module 142, and uploads a selected image to the specific server. For example, a plurality of images displayed on the display unit 151 or one enlarged image may be selectively uploaded.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
a window defining an appearance of a front surface of the electronic device;
a display module disposed below the window;
a touch sensor disposed between the window and the display module;
a fingerprint sensor disposed below the display module;
a metal frame disposed below the display module and the touch sensor; and
a controller configured to:
in response to the touch sensor receiving a single touch input while the display module is in a deactivated state, display a graphic image at a region of the display module overlapped with the fingerprint sensor;
in response to the touch sensor receiving a specific touch input different from the single touch input, while the display module is in the deactivated state, display a lock screen image on the display module and the graphic image at the region of the display module overlapped with the fingerprint sensor;
control the fingerprint sensor to detect fingerprint information through the graphic image at the region of the display module; and
perform an authentication procedure to release a lock state of the electronic device when the detected fingerprint information matches pre-stored fingerprint information,
wherein the display module includes an organic light-emitting diode (OLED), and the touch sensor is disposed on the OLED,
wherein the metal frame includes an opening area, and
wherein the fingerprint sensor is disposed in the opening area of the metal frame.

2. The electronic device of claim 1, further comprising:
a main circuit board having the fingerprint sensor disposed thereon.

3. The electronic device of claim 1, wherein the fingerprint sensor is disposed adjacent to an edge of the electronic device formed by a case of the electronic device and the display module.

4. The electronic device of claim 1, wherein the touch sensor includes an opening area through which the fingerprint sensor is disposed adjacent to an edge of the electronic device.

5. The electronic device of claim 1, further comprising:
a first graphite sheet disposed below the display module and having an opening,
wherein the fingerprint sensor is disposed in the opening of the first graphite sheet.

6. The electronic device of claim 5, further comprising:
a second graphite sheet disposed below the first graphite sheet and having an opening corresponding to the opening of the first graphite sheet,
wherein the fingerprint sensor is disposed in the openings of the first and second graphite sheets.

7. The electronic device of claim 6, further comprising:
a support frame disposed below the first and second graphite sheets,
wherein the support frame includes an opening corresponding to the openings of the first and second graphite sheets, and
wherein the fingerprint sensor is disposed in the openings of the support frame and the first and second graphite sheets.

8. The electronic device of claim 6, further comprising:
a third graphite sheet disposed below the support frame and not including an opening correspond to the openings of the support frame and the first and second graphite sheets.

9. The electronic device of claim 1, wherein the controller is further configured to:
display an always-on display image on the display module in the deactivated state of the display module.

10. The electronic device of claim 9, wherein the controller is further configured to:
activate the touch sensor in response to a touch input on the display module in an area excluding the region of the display module overlapped with the fingerprint sensor.

11. The electronic device of claim 10, wherein the controller is further configured to:
not activate the touch sensor in response to a touch input on the display module in the region of the display module overlapped with the fingerprint sensor.

12. The electronic device of claim 1, wherein the controller is further configured to:
display an always-on display image on the display module in the deactivated state of the display module.

13. The electronic device of claim 12, wherein the controller is further configured to:
activate the touch sensor in response to a touch input on the display module in an area excluding the region of the display module overlapped with the fingerprint sensor.

14. The electronic device of claim 13, wherein the controller is further configured to:
not activate the touch sensor in response to a touch input on the display module in the region of the display module overlapped with the fingerprint sensor.

15. An electronic device, comprising:
a window defining appearance of a front surface of the electronic device;
a display module disposed below the window;
a touch sensor disposed between the window and the display module;
a heat dissipation sheet disposed below the display module and having an opening;
a fingerprint sensor disposed below the display module and in the opening of the heat dissipation sheet; and
a metal frame disposed below the display module and the touch sensor; and
a controller configured to:
in response to the touch sensor receiving a single touch input while the display module is in a deactivated state, display a graphic image at a region of the display module overlapped with the fingerprint sensor;

in response to the touch sensor receiving a specific touch input different from the single touch input, while the display module is in the deactivated state, display a lock screen image on the display module and the graphic image at the region of the display module overlapped with the fingerprint sensor;

control the fingerprint sensor to detect fingerprint information through the graphic image region at the region of the display module; and perform an authentication procedure to release a lock state of the electronic device when the detected fingerprint information matches pre-stored fingerprint information, wherein the display module includes an organic light-emitting diode (OLED), and the touch sensor is disposed on the OLED, wherein the metal frame includes an opening area, and wherein the fingerprint sensor is disposed in the opening area of the metal frame.

16. The electronic device of claim 15, further comprising:
a main circuit board having the fingerprint sensor disposed thereon.

17. The electronic device of claim 15, wherein the fingerprint sensor is disposed adjacent to an edge of the electronic device formed by a case of the electronic device and the display module.

18. The electronic device of claim 15, wherein the touch sensor includes an opening area through which the fingerprint sensor is disposed adjacent to an edge of the electronic device.

* * * * *